(12) United States Patent
Yu

(10) Patent No.: US 11,064,207 B1
(45) Date of Patent: Jul. 13, 2021

(54) IMAGE AND VIDEO PROCESSING METHODS AND SYSTEMS

(71) Applicant: Jianghong Yu, Beijing (CN)

(72) Inventor: Jianghong Yu, Beijing (CN)

( * ) Notice: Subject to any disclaimer, the term of this patent is extended or adjusted under 35 U.S.C. 154(b) by 0 days.

(21) Appl. No.: 17/086,407

(22) Filed: Nov. 1, 2020

(30) Foreign Application Priority Data

Apr. 9, 2020 (CN) .......................... 202010276253.7

(51) Int. Cl.
*H04N 19/159* (2014.01)
*H04N 19/172* (2014.01)
*H04N 19/176* (2014.01)
*H04N 19/85* (2014.01)

(52) U.S. Cl.
CPC ......... *H04N 19/159* (2014.11); *H04N 19/172* (2014.11); *H04N 19/176* (2014.11); *H04N 19/85* (2014.11)

(58) Field of Classification Search
None
See application file for complete search history.

(56) References Cited

U.S. PATENT DOCUMENTS

| | | | | |
|---|---|---|---|---|
| 5,394,483 A * | 2/1995 | Daly | .......................... | G06T 5/50 375/E7.167 |
| 5,546,477 A * | 8/1996 | Knowles | .................. | G06F 17/14 375/E7.03 |
| 6,021,378 A * | 2/2000 | Reiter | ..................... | G01V 1/247 702/14 |
| 6,760,487 B1 * | 7/2004 | Linares | ................ | H04N 19/117 375/240.02 |
| 7,809,200 B2 * | 10/2010 | Aguilar | ................ | H04N 19/124 382/232 |
| 8,243,790 B2 * | 8/2012 | Leontaris | ............. | H04N 19/115 375/240.02 |
| 8,310,431 B2 * | 11/2012 | Kimura | .................. | G09G 5/008 345/100 |
| 8,874,812 B1 * | 10/2014 | Hobbs | ...................... | G09G 5/14 710/58 |
| 2002/0034337 A1 * | 3/2002 | Shekter | .................. | G06T 5/002 382/275 |
| 2003/0039396 A1 * | 2/2003 | Irvine | .................... | H04N 19/60 382/233 |
| 2007/0237232 A1 * | 10/2007 | Chang | .................. | H04N 19/192 375/240.16 |

(Continued)

*Primary Examiner* — Mohammad J Rahman
(74) *Attorney, Agent, or Firm* — Fideli Law PLLC

(57) ABSTRACT

The data processing method and system provided in the present specification may use an encoding convolution kernel to perform an encoding spectrum-adjustment on an original frame in original data when compressing the original data, so that the amplitude of the intermediate-frequency to high-frequency region in the original frame may be smoothly reduced, thereby reducing the data information in the original frame and improve the encoding efficiency. Thus, the compressed data volume is reduced. When the method and system are employed to decompress a compressed frame, a decoding convolution kernel may be used to perform a decoding spectrum-adjustment on the compressed frame, where the decoding convolution kernel corresponds to the encoding convolution kernel, so as to restore the data in the compressed frame and obtain a decompressed frame. The method and system may improve data compression efficiency and transmission efficiency.

20 Claims, 8 Drawing Sheets

(56) References Cited

U.S. PATENT DOCUMENTS

| | | | |
|---|---|---|---|
| 2007/0257988 A1* | 11/2007 | Ong | H04N 17/004 348/182 |
| 2008/0037880 A1* | 2/2008 | Lai | H04N 19/172 382/232 |
| 2009/0180531 A1* | 7/2009 | Wein | G10L 19/08 375/240 |
| 2010/0135418 A1* | 6/2010 | Zhang | H04N 19/423 375/240.25 |
| 2011/0310961 A1* | 12/2011 | Boskovic | H04N 19/14 375/240.03 |
| 2013/0226595 A1* | 8/2013 | Liu | H04N 19/60 704/500 |
| 2014/0205101 A1* | 7/2014 | Yamamoto | G10L 19/0208 381/22 |
| 2015/0003518 A1* | 1/2015 | Nguyen | H04N 19/134 375/240.03 |
| 2015/0319439 A1* | 11/2015 | Jang | H04N 19/11 375/240.03 |
| 2016/0134865 A1* | 5/2016 | Amer | H04N 19/176 375/240.02 |
| 2016/0269725 A1* | 9/2016 | Mrak | H04N 19/176 |
| 2016/0271495 A1* | 9/2016 | Perrin | A63F 13/355 |
| 2017/0142444 A1* | 5/2017 | Henry | H04N 19/154 |
| 2017/0345130 A1* | 11/2017 | Wang | G06N 3/0454 |
| 2018/0137603 A1* | 5/2018 | Hsiao | G06T 3/4053 |
| 2018/0139458 A1* | 5/2018 | Wang | H04N 19/17 |
| 2018/0308497 A1* | 10/2018 | Chau | G10L 25/18 |
| 2019/0287542 A1* | 9/2019 | Fueg | G10L 19/005 |
| 2020/0126186 A1* | 4/2020 | Kim | G06N 3/0481 |
| 2020/0395034 A1* | 12/2020 | Sugiura | G10L 19/032 |
| 2020/0411016 A1* | 12/2020 | Sugiura | G10L 25/18 |

* cited by examiner

| 4 | 2 | -8 | 0 | -5 | -22 | -3 | -18 | -47 | 23 | 384 | 23 | -47 | -18 | -3 | -22 | -5 | 0 | -8 | 2 | 4 |
|---|---|---|---|---|---|---|---|---|---|---|---|---|---|---|---|---|---|---|---|---|
| 4 | 6 | -8 | -5 | -6 | -18 | -14 | -19 | -44 | 0 | 464 | 0 | -44 | -19 | -14 | -18 | -6 | -5 | -8 | 6 | 4 |
| -8 | 23 | -37 | 26 | -23 | -21 | 8 | -72 | 28 | -97 | 602 | -97 | 28 | -72 | 8 | -21 | -23 | 26 | -37 | 23 | -8 |

FIG. 10

| -2 | -6 | -20 | 10 | -7 | -32 | 5 | -37 | 60 | 51 | 432 | 51 | -60 | -27 | 5 | -32 | -7 | 10 | -20 | -6 | -2 |
|---|---|---|---|---|---|---|---|---|---|---|---|---|---|---|---|---|---|---|---|---|
| -1 | -3 | -15 | 2 | -13 | -24 | -11 | -24 | -55 | 14 | 516 | 14 | -55 | -24 | -11 | -24 | -13 | 2 | -15 | -3 | -1 |
| -12 | 17 | -39 | 28 | -26 | -39 | 10 | -81 | 5 | -74 | 660 | -74 | 5 | -81 | 10 | -39 | -26 | 28 | -39 | 17 | -12 |

FIG. 11

IMAGE AND VIDEO PROCESSING METHODS AND SYSTEMS

This application claims the benefit of priority to Chinese Patent Application No. 202010276253.7, filed Apr. 9, 2020, and entitled "DATA PROCESSING METHODS AND SYSTEMS," the entire content of which is incorporated herein by reference.

TECHNICAL FIELD

The present application relates to the field of data processing, and in particular, to a data processing method and system.

BACKGROUND INFORMATION

With wide applications of Internet technologies, especially with the increasing use of mobile terminals, there are more and more types of data used in communication networks. Also, with the popularization of computers, more and more data, such as video data, audio data, and the like, have occupied more and more network resources and storage resources. The data often contain a huge amount of information, thereby bringing out quite high requirements for data storage and transmission. In order to facilitate data storage and transmission, it is often necessary to compress the data before storage and transmission, and then restore the data by decompressing the compressed data when the data is in use. This further results an increasingly popularity of data compression and decompression technologies.

In the past several decades, the video and image compression technology has been increasingly utilized in many applications. A video often contains a huge amount of information. From traditional applications such as radio, film and television to the more current applications such as monitoring and Internet applications, compressed videos and images are taking up more and more network and storage resources. Thus, in the case where the original data of a piece of video is transmitted from one terminal to another through a network, a lot of network resources are occupied. As a result, it may be difficult to achieve a smooth transmission in certain scenarios of real-time video transmission. Therefore, in practice before video data is transmitted, the video data is first subjected to the compression processing by a data compression device so as to facilitate the transmission. Subsequently, the transmitted compressed video data are further transmitted to a data decompression device through a transmission medium, and then the data decompression device decompresses the compressed video data to at least partially restore the video images.

The main video compression standards in the existing technology are the Recommendation ITU-T H.264/H.265. Before transmission, a video is generally subjected to an overall compression process using an encoder according to the Recommendation ITU-T H.264/H.265, and then after transmission, the compressed video is subjected to an overall decompression process by a decoder according to the Recommendation ITU-T H.264/H.265. However, the above-mentioned processing method for overall compression of the video is still not undesirable in terms of the balance between the amount of calculation and the resolution of the compressed video due to the following reason. When processing an original video, according to the Recommendation ITU-T H.264/H.265 various complicated algorithms are required to generate a predictive frame of the original frame, and then the residual between the original frame and the predictive frame is recorded. As a result, the closer the predictive frame is to the original frame, the smaller the residual, and the smaller the amount of data after a video is encoded. Thus, in order to make the encoding process easier, a commonly used approach is to reduce the high-frequency information in the original frame image by filtering the original frame. It may be known according to the Fourier transform that the frequency information of the boundary part of an object in an image is often relatively rich, and the high-frequency components of the boundary part are usually larger than those of other flat regions. Therefore, although the frame image with reduced high-frequency information becomes visually blurred (that is, the sharpness of the image is reduced), this approach may make the residual between the predictive frame and the filtered original frame smaller. In this way, the amount of calculation required for video encoding and the encoded data stream are greatly reduced. However, the technology of frame prediction is very complicated and will consume a lot of computing resources. Taking a video codec system as an example, an average increase of 30% to 40% in coding efficiency may require an increase of about 10 times the amount of calculation. Therefore, how to further improve the efficiency of data compression has been the goal pursued in the field of data compression technology.

Therefore, in order to improve the data transmission efficiency, a method and system for data processing with higher compression efficiency are needed.

BRIEF SUMMARY

The present application provides a method and system for data processing with higher compression efficiency. The data processing method and system include an encoding end and a decoding end for the data. Taking video data as an example, when the original video data is compressed at the encoding end, the original frame in the original video data may be subjected to an encoding spectrum-adjustment in order to reduce the signal strength of the original frame in a selected frequency domain, thereby reducing the amount of data information. Specifically, the encoding spectrum-adjustment may smoothly reduce the amplitude of the selected area in the original frame, thereby reducing the amount of data information in the original frame, and then the spectrally adjusted data are further encoded to obtain a compressed frame. Next, at the decoding end, when the method and system disclosed provided herein are employed to decompress the compressed frame, the compressed frame may be firstly decoded, and then the decoded compressed frame is further adjusted for decoding spectrum-adjustment. In this way, in an important frequency region, the original frame undergoes signal attenuation in a frequency domain rather than filtering in the frequency domain, and the information of the original frame in the entire frequency domain is not lost. Therefore, it is possible to design a corresponding decoding spectrum-adjustment according to the encoding spectrum-adjustment, and thus the information on all frequencies in the original frame may be at least partially restored. That is to say, without significantly increasing the amount of codec calculation, the decoding end of the video transmission may at least partially restore the clarity of the original frame. In many cases, an image clarity that is even higher than that of the original frame many be obtained. Hence, the method and system provide herein may significantly improve the data compression efficiency and the data transmission efficiency.

To this end, in a first aspect, the present application provides a data processing method, comprising: selecting an original frame in original data, the original frame including original data of a preset number of bytes; and performing data compression on the original frame to obtain a compressed frame, wherein the data compression includes an encoding spectrum-adjustment on an under-compression-frame, the under-compression-frame includes the original frame and any data state before the original frame becomes the compressed frame during the data compression, the encoding spectrum-adjustment includes using an encoding convolution kernel to convolve the under-compression-frame, so as to smoothly reduce an amplitude of an intermediate-frequency region of the under-compression-frame in a frequency domain.

In some embodiments, the encoding spectrum-adjustment smoothly reduces an amplitude in a high-frequency region in the frequency domain.

In some embodiments, the encoding spectrum-adjustment smoothly reduces an amplitude of a low-frequency region of the under-compression-frame in the frequency domain; and a reducing degree of the amplitude of the low-frequency region of the under-compression-frame by the encoding spectrum-adjustment is lower than that of the intermediate-frequency region.

In some embodiments, an amplitude adjustment gain of the under-compression-frame at any frequency in the frequency domain resulted from the encoding spectrum-adjustment is greater than zero.

In some embodiments, the performing data compression on the original frame includes at least one of the following ways: firstly performing the encoding spectrum-adjustment on the original frame, and then performing a prediction and finding a residual with the original frame after the encoding spectrum-adjustment; firstly performing the prediction with the original frame to obtain a predicted original frame, and then performing the encoding spectrum-adjustment with the original frame and the predicted original frame and finding the residual; and firstly performing the prediction and finding the residual with the original frame, and then performing the encoding spectrum-adjustment with the residual.

In some embodiments, the encoding spectrum-adjustment on the under-compression-frame includes: determining a frame type of the original frame; and selecting, based on the frame type of the original frame, a convolution kernel from a group of encoding convolution kernels as the encoding convolution kernel to convolve the under-compression-frame.

In some embodiments, the frame type includes at least one of an intra predictive frame, a forward predictive frame, and a bidirectional predictive frame.

In some embodiments, when the original frame is a bidirectional predictive frame, the encoding convolution kernel of the under-compression-frame corresponding to the original frame is the same as the encoding convolution kernel of the under-compression-frame corresponding to a reference frame closest to the original frame.

In some embodiments, the convolving the under-compression-frame includes: convolving the under-compression-frame in at least one of a vertical direction, a horizontal direction and an oblique direction.

In in a second aspect, the present application provides a data processing system, comprising: at least one storage medium for data processing, including at least one set of instructions; at least one processor in communication connection with the at least one storage medium, wherein when the system is in operation, the at least one processor reads the at least one set of instructions and executes the data processing method according to the first aspect of the present application according to an instruction of the at least one set of instructions.

In in a third aspect, the present application provides another data processing method, comprising: obtaining compressed data, the compressed data including a compressed frame obtained by performing data compression on an original frame, and the data compression including an encoding spectrum-adjustment; and performing data decompression on the compressed frame to obtain a decompressed frame, wherein the data decompression includes performing a decoding spectrum-adjustment on an under-decompression-frame, the under-decompression-frame includes the compressed frame and any data state before the compressed frame becomes the decompressed frame during the data decompression, and the decoding spectrum-adjustment corresponds to the encoding spectrum-adjustment.

In some embodiments, the encoding spectrum-adjustment includes using an encoding convolution kernel to convolve the under-compression-frame, so that an amplitude adjustment gain of the under-compression-frame at any frequency from low frequencies to medium-high frequencies is greater than zero, the under-compression-frame includes the original frame and any data state before the original frame becomes the compressed frame during the data compression; and the decoding spectrum-adjustment includes using a corresponding decoding convolution kernel to convolve the under-decompression-frame based on the encoding convolution kernel.

In some embodiments, the performing data decompression on the compressed frame includes: decoding the compressed frame to obtain a decoded frame, the under-decompression-frame including the decoded frame; and performing the decoding spectrum-adjustment on the decoded frame to obtain the decompressed frame.

In some embodiments, the performing the decoding spectrum-adjustment on the decoded frame includes: determining a frame type of the decoded frame; selecting, based on the frame type of the decoded frame, a convolution kernel from a group of decoding convolution kernels as the decoding convolution kernel, and convolving the decoded frame; and obtaining the decompressed frame based on a convolution result of the decoded frame.

In some embodiments, the obtaining the decompressed frame based on a convolution result of the decoded frame includes: obtaining boundary data of the decoded frame based on the convolution result of the decoded frame; and superimposing the decoded frame on the boundary data of the decoded frame to obtain the decompressed frame.

In some embodiments, the obtaining the decompressed frame based on a convolution result of the decoded frame includes: using the convolution result of the decoded frame as the decompressed frame.

In some embodiments, the frame type includes at least one of an intra predictive frame, a forward predictive frame, and a bidirectional predictive frame.

In some embodiments, when the decoded frame is a bidirectional predictive frame, the decoding convolution kernel of the decoded frame is the same as the decoding convolution kernel of a reference frame closest to the decoded frame.

In some embodiments, the convolving the decoded frame includes: convolving the decoded frame in at least one of a vertical direction, a horizontal direction, and an oblique direction.

In in a fourth aspect, the present application provides a data processing system, comprising: at least one storage medium for data processing, including at least one set of instructions; at least one processor in communication connection with the at least one storage medium, wherein when the system is in operation, the at least one processor reads the at least one set of instructions and executes the data processing method according to the third aspect of the present application according to an instruction of the at least one set of instructions.

Other functions of the data processing method and system provided in the present application will be partially described in the following description. According to the description, the contents introduced by the following figures and examples will be obvious to those of ordinary skill in the art. The inventive aspects of the data processing method, system and storage medium provided in the present application may be fully explained by practicing or using the method, device and combinations thereof described in the detailed examples below.

BRIEF DESCRIPTION OF THE DRAWINGS

The following figures illustrate in detail the exemplary embodiments disclosed in the present application. The same reference numerals indicate similar structures shown in different figures. A person of ordinary skill in the art will understand that these embodiments are merely exemplary embodiments rather than limiting embodiments. The accompanying drawings are only for the purpose of illustration and description, and are not intended to limit the scope of the present application. Other embodiments may also accomplish the objects of the present application.

FIG. 10 shows a parameter table of a group of decoding convolution kernels in a normal mode provided according to some exemplary embodiments of the present application.

FIG. 11 shows a parameter table of a group of decoding convolution kernels in an enhanced mode provided according to some exemplary embodiments of the present application.

DETAILED DESCRIPTION OF THE DRAWINGS

The following description provides specific application scenarios and requirements of the present application in order to enable a person skilled in the art to make and use the present application. Various modifications to the disclosed embodiments will be apparent to a person skilled in the art. The general principles defined herein may be applied to other embodiments and applications without departing from the spirit and scope of the present application. Therefore, the present application is not limited to the embodiments described herein, but the broadest scope consistent with the claims.

The terminology used herein is for the purpose of describing particular exemplary embodiments only and is not intended to be limiting. As used herein, the singular forms "a", "an" and "the" may include their plural forms as well, unless the context clearly indicates otherwise. When used in this disclosure, the terms "comprises", "comprising", "includes" and/or "including" refer to the presence of stated features, integers, steps, operations, elements, and/or components, but do not preclude the presence or addition of one or more other features, integers, steps, operations, elements, components, and/or groups thereof.

In view of the following description, these and other features of the present application, as well as operations and functions of related elements of the structure, and the economic efficiency of the combination and manufacture of the components, may be significantly improved. All of these form part of the present application with reference to the drawings. However, it should be clearly understood that the drawings are only for the purpose of illustration and description, and are not intended to limit the scope of the present application. It is also understood that the drawings are not drawn to scale.

The flowcharts used in the present application show the operations of the system according to some embodiments in the present application. It should be understood that the operations of the flowcharts may be implemented out of order. The operations may be performed in a reverse order or simultaneously. In addition, one or more other operations may be added to the flowcharts, and one or more operations may be removed from the flowcharts.

In the first aspect, the present application provides a data processing system 100 (hereinafter referred to as the system 100). In the second aspect, the present application describes a data processing method P200 that compresses data. In the third aspect, the present application describes a data processing method P300 that decompresses a compressed frame.

Figure 1:
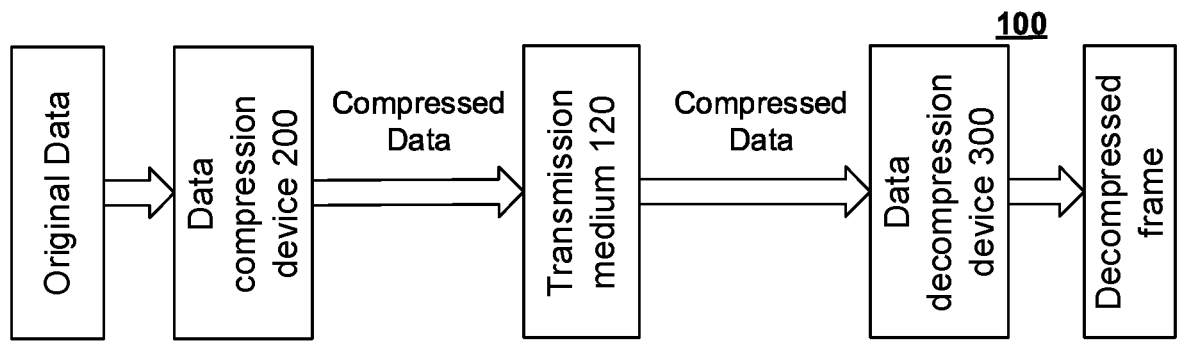
FIG. 1 shows a schematic diagram of a data processing system provided according to some exemplary embodiments of the present application.

FIG. 1 shows a schematic diagram of the data processing system 100. The system 100 may include a data compression device 200, a data decompression device 300, and a transmission medium 120.

The data compression device 200 may receive the original data to be compressed, and then use the data processing method P200 provided by the present application to compress the original data so as to generate a compressed frame. To this end, the data compression device 200 may store the data or instructions for executing the data processing method P200 as described in the present application; execute the data and/or instructions as described; and generate compressed data.

The data decompression device 300 may receive a compressed frame and decompress the compressed frame using the data processing method P300 provided by the present application to obtain a decompressed frame. The data decompression device 300 may store the data or instructions for executing the data processing method P300 as described in the present application, and execute the data and/or instructions accordingly.

The data compression device 200 and the data decompression device 300 may include a wide range of devices. For example, the data compression device 200 and the data decompression device 300 may include desktop computers, mobile computing devices, notebook computers (e.g., laptops), tablet computers, set-top boxes, smart phones and other handheld devices, televisions, cameras, display devices, digital media players, video game consoles, in-vehicle computers, or the like.

As shown in FIG. 1, the data compression device 200 and the data decompression device 300 may be connected through the transmission medium 120. The transmission medium 120 may facilitate the transmission of information and/or data. The transmission medium 120 may be any type of data carrier that may transmit a compressed frame from the data compression device 200 to the data decompression device 300. For example, the transmission medium 120 may be a storage medium (for example, an optical disk), a wired or wireless communication medium. The communication medium may be a network. In some embodiments, the transmission medium 120 may be any type of wired or wireless network, or a combination thereof. For example, the transmission medium 120 may include a cable network, a wired network, an optical fiber network, a telecommunications network, an intranet, the Internet, a local area network (LAN), a wide area network (WAN), a wireless local area network (WLAN), a metropolitan area network (MAN), a wide area network (WAN), a public switched telephone network (PSTN), a Bluetooth network, a ZigBee network, a near field communication (NFC) network or a similar network. One or more components in the data decompression device 300 and the data compression device 200 may be connected to the transmission medium 120 to transmit data and/or information. The transmission medium 120 may include a router, a switch, a base station, or other device that may facilitate the communication from the data compression device 200 to the data decompression device 300. In other embodiments, the transmission medium 120 may be a storage medium, such as a mass storage medium, a removable memory, a volatile read-write memory, a read-only memory (ROM), or the like, or any combination thereof. Exemplary mass storage media may include non-transitory storage media, such as magnetic disks, optical disks, solid-state drives, and the like. Removable storage media may include flash drives, floppy disks, optical disks, memory cards, zip disks, tapes, and the like. A typical volatile read-write memory may include a random access memory (RAM). RAM may include dynamic RAM (DRAM), dual date rate synchronous dynamic RAM (DDR SDRAM), static RAM (SRAM), thyristor RAM (T-RAM), and zero-capacitance RAM (Z-RAM). ROM may include mask ROM (MROM), programmable ROM (PROM), virtual programmable ROM (PEROM), electronic programmable ROM (EEPROM), compact disk (CD-ROM), and digital versatile disk ROM. In some embodiments, the transmission medium 120 may be a cloud platform. Merely by way of example, the cloud platform may include a private cloud, a public cloud, a hybrid cloud, a community cloud, a distributed cloud, an inter-cloud cloud, or other forms similar to the above forms, or any combination of the above forms.

As shown in FIG. 1, the data compression device 200 receives original data, and executes the instructions of the data processing method P200 as described in the present application to perform data compression on the original data, so as to generate a compressed frame; the compressed frame is then transmitted to the data decompression device 300 through the transmission medium 120; next, the data decompression device 300 executes the instructions of the data processing method P300 as described in the present application to perform data decompression on the compressed frame, so as to obtain a decompressed frame.

Figure 2:
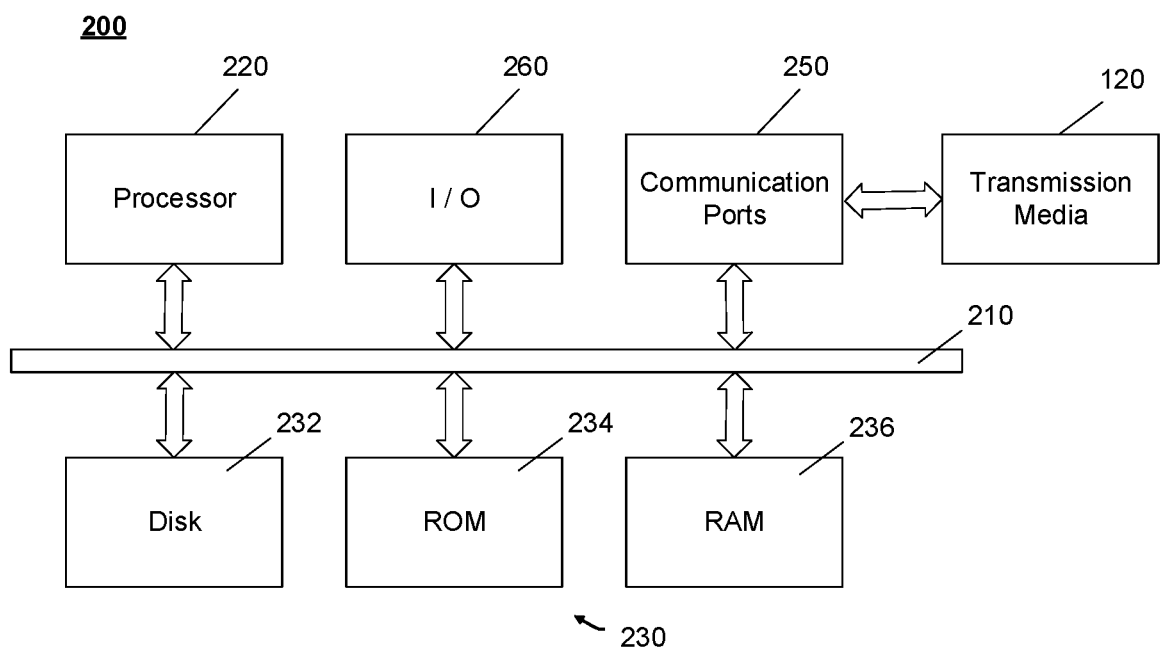
FIG. 2 shows a schematic diagram of a data compression device for data processing according to some exemplary embodiments of the present application.

FIG. 2 shows a schematic diagram of the data compression device 200 for data processing. The data compression device 200 may execute the data processing method P200 as described in the present application. The data processing method P200 will be introduced in other parts of the present application. For example, the data processing method P200 is described in the description of FIGS. 4 to 6.

As shown in FIG. 2, the data compression device 200 includes at least one storage medium 230 and at least one compression-end processor 220. In some embodiments, the data compression device 200 may further include a communication port 250 and an internal communication bus 210. Meanwhile, the data compression device 200 may also include an I/O component 260.

The internal communication bus 210 may connect different system components, including the storage medium 230 and the compression-side processor 220.

The I/O component 260 may support the input/output between the data compression device 200 and other components.

The storage medium 230 may include a data storage device. The data storage device may be a non-transitory storage medium or a temporary storage medium. For example, the data storage device may include one or more of a magnetic disk 232, a read-only storage medium (ROM) 234, and a random access storage medium (RAM) 236. The storage medium 230 may also include at least one set of instructions stored in the data storage device. The instructions are computer program code, and the computer program code may include the programs, routines, objects, components, data structures, processes, modules, etc. for executing the data processing method as provided by the present application.

The communication port 250 is used for data communication between the data compression device 200 and the outside world. For example, the data compression device 200 may be connected to the transmission medium 120 through the communication port 250.

At least one compression-end processor 220 is in the communication connection with at least one storage medium 230 via the internal communication bus 210. At least one compression-end processor 220 is used to execute the at least one set of instructions. When the system 100 is in operation, the at least one compression-side processor 220 reads the at least one set of instructions and executes the data processing method P200 according to the instruction of the at least one set of instructions. The compression-side processor 220 may perform all of the steps included in the data processing method P200. The compression-side processor 220 may be in the form of one or more processors. In some embodiments, the compression-side processor 220 may include one or more hardware processors, the examples include microcontrollers, microprocessors, reduced set of instructions computers (RISC), application specific integrated circuits (ASICs), application-specific set of instructions processors (ASIP), central processing units (CPU), graphics processing units (GPU), physical processing units (PPU), microcontroller units, digital signal processors (DSP), field programmable gate arrays (FPGA), advanced RISC machines (ARM), programmable logic devices (PLD), or any circuit or processor that is capable of executing one or more functions, or any combination thereof. For the purpose of description, only one compression-side processor 220 is described in the data compression device 200 in the present application. However, it should be noted that the data compression device 200 in the present application may also include multiple processors. Thus, the operations and/or method steps disclosed in the present application may be performed by one processor as described in the present application, or may be performed jointly by multiple processors. For example, if the compression-end processor 220 of the data compression device 200 performs steps A and B in the present application, it should be understood that step A and step B may be performed jointly or separately by two different compression-end processors 220 (for example, a first processor performs step A, a second processor performs step B, or the first and second processors perform steps A and B together).

Although the above structure describes the data compression device 200, this structure is also applicable to the data decompression device 300. The data decompression device 300 may execute the data processing method P300 as described in the present application. The data processing method P300 will be introduced in other parts of the present application. For example, the data processing method P300 is described in the description of FIGS. 7 to 11.

The data processing methods P200, P300 and the system 100 may be used for data compression and decompression to improve the data transmission efficiency and save resources and spaces. The data herein may be non-real-time data or real-time data. There are a variety of data in the areas from the traditional radio, film and television to the current monitoring and Internet applications. For example, the data may be non-real-time video data, audio data, image data, and so on. The data may also be real-time map data, real-time sensor data, real-time video monitoring data, network monitoring data, meteorological data, aerospace data, and so on. For example, the data may be map data received from a base station by an autonomous vehicle during driving. The present application does not limit the data to a specific type of data. The data processing method described in the present application is consistent with the methods and steps taken by the system when processing different types of data. Thus, for the convenience of presentation, the present application will take video data processing as an example for description.

The data processing methods P200, P300 and the system 100 may significantly improve the compression efficiency of video data, and improve the transmission efficiency and reduction rate of video. In the traditional video compression technology, Recommendation ITU-T H.264/H.265 are usually used to encode video data, so as to achieve the purpose of compressing the video data. Recommendation ITU-T H.264/H.265 mainly use predictive coding to encode video data. That is, an original frame is predicted to obtain a predictive value, and then the predictive value is subtracted from the original value of the original frame to obtain a residual value, thereby compressing the video data. During restoring and decompressing (that is, decoding), the original frame may be restored by adding the residual value to the predictive value. The data processing method P200 may use a combination of encoding spectrum-adjustment and encoding to perform data compression on the video data to obtain a compressed frame, so as to further improve the compression ratio of the video data and the efficiency of video transmission. The data processing method P300 may use a combination of decoding (that is, restoring the under-compression-frame according to the residual value and predictive value) and decoding spectrum-adjustment to perform data decompression on the compressed frame so as to restore the data in the compressed frame. The encoding spectrum-adjustment herein refers to adjusting the amplitude of the spectrogram of the data to be processed. For example, the encoding spectrum-adjustment may perform amplitude attenuation on the data to be processed in the frequency domain of, thereby reducing the amount of information in the data to be processed; for example, the amplitude of a selected frequency region in the frequency domain of the data to be processed may be attenuated; for example, the amplitude of intermediate-frequency region may be attenuated; and for example, the amplitude of a region from intermediate-frequency to high-frequency may be attenuated. A person of ordinary skill in the art would understand that the frequency component of the data after encoding spectrum-adjustment in the selected frequency region becomes smaller, and thus the amount of information in the data is reduced. Therefore, the efficiency of encoding data after the encoding spectrum-adjustment may be improved and the compression ratio may also be improved. The decoding spectrum-adjustment may enable the data subjected to the encoding spectrum-adjustment to be completely restored or approximately restored to the state before the encoding spectrum-adjustment without considering other calculation errors. Therefore, the data processing methods P200, P300 and the system 100 may significantly improve the compression efficiency of video data, and improve the transmission efficiency and reduction rate of videos. The specific processes of the encoding spectrum-adjustment and the decoding spectrum-adjustment will be described in detail in the following descriptions. When the system 100 performs data compression on video data, the orders of the encoding spectrum-adjustment and the encoding may be exchanged, or may be performed alternately. Similarly, when the system 100 performs data decompression on the compressed frame, the orders of the decoding spectrum-adjustment and the decoding order may be exchanged, or may be performed alternately. It should be noted that, in order to ensure that following the decompression the information in the original data may be restored, the order of the data decompression needs to correspond to the order of the data compression. That is, the data decompression may operate in a symmetrical reverse order with respect to the data compression. For example, if the compressed frame is obtained by performing the encoding spectrum-adjustment before performing the encoding, the compressed frame should be subjected to the decoding and then the decoding spectrum-adjustment during data decompression. For easy description, the original data before data compression processing is defined as $P_0$, the decompressed frame obtained by decompressing by the data decompression device 300 is defined as $P_4$; in addition, the encoding spectrum-adjustment function corresponding to the encoding spectrum-adjustment is defined as $H_1(f)$, the decoding spectrum-adjustment function corresponding to decoding spectrum-adjustment is defined as $H_2(f)$, and the transfer function between the decompressed frame $P_4$ and the original data is defined as an overall spectrum adjustment function $H_0(f)$.

Figure 3A:
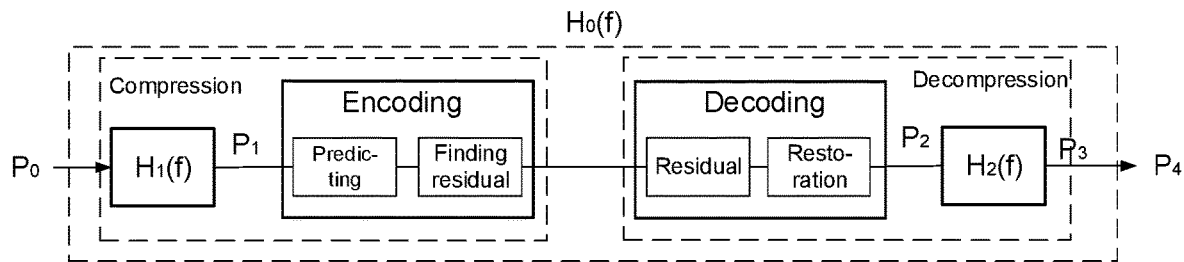
FIG. 3A shows a flowchart of data compression and data decompression provided according to some exemplary embodiments of the present application.

FIG. 3A shows a flowchart of data compression and data decompression provided according to an embodiment of the present application. As shown in FIG. 3A, the process of performing data compression on the original data by the data compression device 200 may include: the data compression device 200 may first perform the encoding spectrum-adjustment on the original data, and then perform the encoding, that is, perform the prediction and finding the residual, so as to obtain the compressed frame. The data compression method shown in FIG. 3A may improve the encoding efficiency, reduce the amount of data in the compressed frame, and improve the compression ratio. The process of performing data decompression on the compressed frame by the data decompression device 300 may include: the data decompression device 300 may firstly perform the decoding on the compressed frame, and then obtain the decompressed frame through the decoding spectrum-adjustment. The specific process will be described in detail later.

The data compression device 200 may perform data compression on original data by integrating the encoding spectrum-adjustment into the encoding process. The encoding spectrum-adjustment may be performed at any stage in the encoding process. Correspondingly, the decoding spectrum-adjustment may also be performed at the corresponding stage of the decoding process.

Figure 3B:
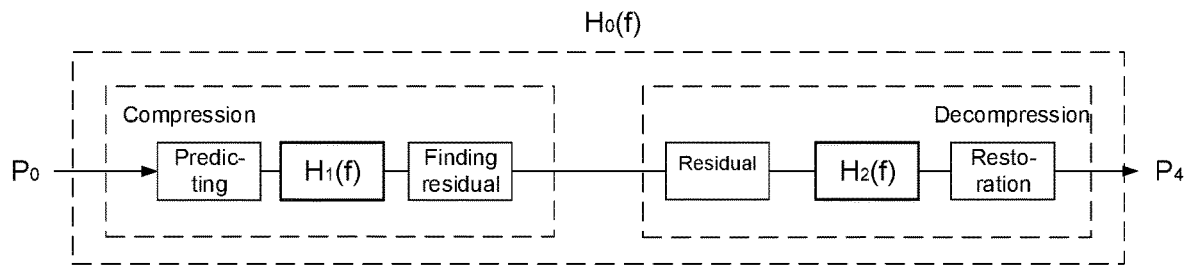
FIG. 3B shows a flowchart of data compression and data decompression provided according to some exemplary embodiments of the present application.

FIG. 3B shows a flowchart of data compression and data decompression provided according to an embodiment of the present application. As shown in FIG. 3B, the process of performing data compression on the original data by the data compression device 200 may include: the data compression device 200 may firstly perform prediction on the original data to obtain a predictive value, and then perform the encoding spectrum-adjustment on the original frame and the predictive value and finding the residual, so as to obtain the residual value, that is, the compressed frame. The specific operations shown in FIG. 3B are the same as those shown in FIG. 3A, except that the order of operations is different. The process of performing data decompression on the compressed frame by the data decompression device 300 may include: the data decompression device 300 may perform decoding spectrum-adjustment on the decoded the residual value, and then decode the predictive value of the compressed frame, and perform image restoration through the decoded predictive value and the residue value processed through the decoding spectrum-adjustment, so as to obtain the decompressed frame. The process shown in FIG. 3B may reduce the amount of data in the compressed frame, thereby improving the compression ratio and encoding efficiency of the original data, and improving the transmission efficiency of the original data.

Figure 3C:
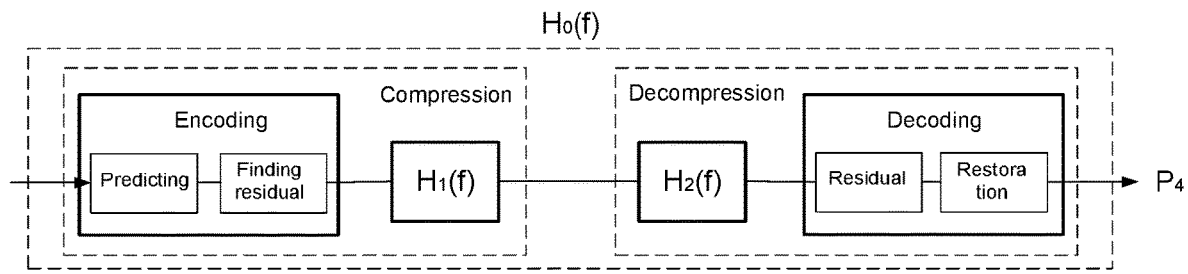
FIG. 3C shows a flowchart of data compression and data decompression provided according to some exemplary embodiments of the present application.

FIG. 3C shows a flowchart of data compression and data decompression provided according to an embodiment of the present application. As shown in FIG. 3C, the process of performing data compression on the original data by the data compression device 200 may include: the data compression device 200 firstly perform the encoding on the original data to obtain a residual value, and then perform the encoding spectrum-adjustment on the residual value to obtain the residual value after the encoding spectrum-adjustment, that is, the compressed frame. The specific operations shown in FIG. 3C is the same as those shown in FIG. 3A, except the operation order is different. The process of performing data decompression on the compressed frame by the data decompression device 300 may include: the data decompression device 300 firstly perform the decoding spectrum-adjustment on the compressed frame, and then perform the decoding to obtain a decompressed frame. The process shown in FIG. 3C may reduce the amount of data in the compressed frame, thereby improving the compression ratio and encoding efficiency of the original data, and improving the transmission efficiency of the original data.

Figure 3D:
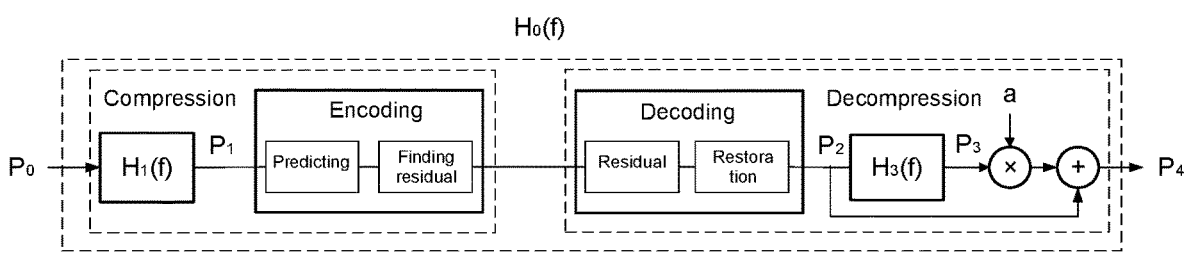
FIG. 3D shows a flowchart of data compression and data decompression provided according to some exemplary embodiments of the present application.

FIG. 3D shows a flowchart of data compression and data decompression provided according to an embodiment of the present application. As shown in FIG. 3D, the process of performing data compression on original data by the data compression device 200 may include: the data compression device 200 firstly perform the encoding spectrum-adjustment on the original data, and then perform the encoding, that is, perform the prediction and finding a residual, so as to obtain a compressed frame. The specific operations shown in FIG. 3D are the same as those shown in FIG. 3A, and will not be repeated herein. The process of performing data decompression on the compressed frame by the data decompression device 300 may include: the data decompression device 300 firstly perform the decoding on the compressed frame, and then obtaining a decompressed frame through the decoding spectrum-adjustment. Specifically, the process of obtaining the decompressed frame through the decoding spectrum-adjustment may include: performing the decoding spectrum-adjustment on the decoded frame obtained after the decoding to obtain boundary information of the decoded frame, and then superimposing the boundary information of the decoded frame on the decoded frame to obtain the decompressed frame. In order to facilitate description and further distinguishing the foregoing process from the decoding process shown in FIG. 3A, the decoding spectrum-adjustment function used for obtaining the boundary information of the decoded frame in FIG. 3D is defined as $H_3(f)$. The process shown in FIG. 3D may reduce the amount of data in the compressed frame, thereby improving the compression ratio and coding efficiency of the original data, and improving the transmission efficiency of the original data.

Figure 4:
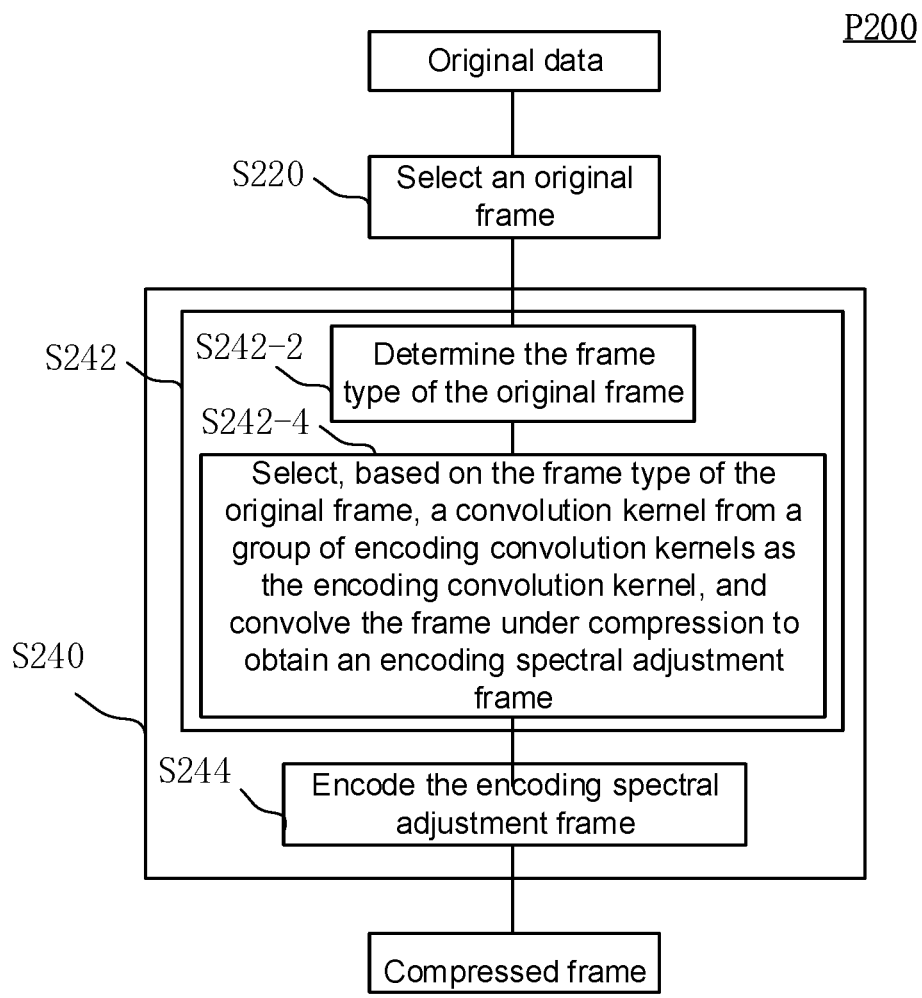
FIG. 4 shows a flowchart of a data processing method for compressing data according to some exemplary embodiments of the present application.

FIG. 4 shows a flowchart of the data processing method P200 for compressing data. As mentioned previously, the data compression device 200 may execute the data processing method P200. Specifically, a storage medium in the data compression device 200 may store at least one set of instructions. The set of instructions may be configured to instruct the compression processor 220 in the data compression device 200 to execute the data processing method P200. When the data compression device 200 is in operation, the compression processor 220 may read the set of instructions and execute the data processing method P200. The method P200 may include:

S220: Select an original frame in original data.

A frame is the basic unit that makes up a data sequence. In data processing, it is often calculated with frames as the basic unit. The original data may include one or more original frames. The original frame may include original data of a preset number of bytes. As mentioned above, the present application takes video data as an example for describing the invention. Therefore, the original data may be original video data, and the original frame may be a frame image in the original video data. In step S220, the data compression device 200 may select a part of frame images from the original data as the original frame, or may select all of the frame images in the original data as the original frame. The data compression device 200 may select the original frame according to the specific original data application scenario. If the original data is used in a scenario that does not require high precision and compression quality, a part of the frame images may be selected as the original frame. For example, a surveillance camera in a quiet place may not have a foreign or new object come into the surveillance images it takes in most of the time; accordingly, most of the frame of the surveillance images of such a place are the same or similar; therefore the data compression device 200 may select a part of the frame images as the original frame for compression and transmission. In another example, for a video of high-definition television, in order to ensure a desirable viewing result, the data compression device 200 may select all frames of images as the original frame for compression and transmission.

S240: Perform a data compression operation on the original frame to obtain a compressed frame.

The data compression operation may include inputting an under-compression-frame into an encoding spectrum-adjustor to perform an encoding spectrum-adjustment. The under-compression-frame includes the original frame and any data state before the original frame becomes the compressed frame after the data compression. The encoding spectrum-adjustment may refer to an adjustment on the amplitude of the spectrum map of the under-compression-frame. For example, the encoding spectrum-adjustment may be performed by an attenuator, and the attenuator may attenuate the amplitude of the under-compression-frame in the frequency domain, thereby reducing the amount of data information in the under-compression-frame. For example, the attenuator may be configured to reduce the amplitude of a selected area of the under-compression-frame in the frequency domain, such as the amplitude of the intermediate-frequency region, the amplitude of the intermediate-frequency to high-frequency region, etc. For different forms of data, the sensitivity of the viewer or receiver to the frequency may be different. Therefore, the data compression operation may select different regions in the frequency domain for amplitude attenuation according to different forms of data. As mentioned previously, when taking video data as an example, due to the rich information present in the intermediate-frequency and high-frequency regions, reducing the amplitude of the intermediate-frequency to the high-frequency region may visually blur the boundary data of the under-compression-frame. A person of ordinary skill in the art would understand, as compared with the case without such a spectrum adjustment, the frequency component of the intermediate-frequency to high-frequency region in the intermediate state frame after the spectrum adjustment is reduced, and the amount of data information is also reduced. Therefore, the intermediate state frame that has undergone the spectrum adjustment may have a higher compression ratio in encoding. Moreover, the definition for a high-frequency region in different types of data may be different. In some embodiments, the high frequency may include the frequencies within a range of (0.33, 0.5] in the normalized frequency domain. For example, the high frequency may include the frequencies within a range of (0.35, 0.5], (0.4, 0.5] or (0.45, 0.5] in the normalized frequency domain.

In an example of video data compression, the data processing method P200 may adopt a combination of encoding spectrum-adjustment and encoding to compress the original frame, and smoothly reduce the amplitude of the intermediate-frequency to high-frequency region, so as to reduce the amount of data information, improve the compression ratio of video data and the efficiency of video transmission. The under-compression-frame may include any data state of the original frame during the encoding spectrum-adjustment and encoding process, for example, the original frame, the predictive value, the residual value, and the like.

As mentioned above, when the original frame is subjected to data compression, the orders of the encoding spectrum-adjustment and the encoding may be exchanged, or they may be performed alternately. Step S240 may include at least one of the data compression methods shown in FIGS. 3A, 3B, 3C and 3D.

For easy description, the step S240 will be described in detail using the method shown in FIG. 3A as an example, that is, the compression method includes: the data compression device 200 firstly performing the encoding spectrum-adjustment on the original frame, and then encoding (that is, performing prediction and finding the residual) the original frame that has been processed in the encoding spectrum-adjustment. In this case, the data compression device 200 may firstly perform the encoding spectrum-adjustment on the original frame, so that the amplitude of the original frame in the intermediate-frequency to high-frequency region (including intermediate-frequency region and high-frequency region) in the frequency domain is smoothly reduced. Therefore, the boundary information of the original frame is blurred, and an encoding spectrum-adjustment frame is thus obtained to reduce the amount of data in the original frame, thereby reducing the space resources occupied by the original frame. The under-compression-frame includes the encoding spectrum-adjustment frame. Next, the encoding spectrum-adjustment frame is encoded, that is, perform the prediction and find the residual; the encoding spectrum-adjustment frame is used in the prediction to obtain a predictive value of the encoding spectrum-adjustment frame, and then the predictive value of the encoding spectrum-adjustment frame is subtracted from the initial value of the encoding spectrum-adjustment frame to obtain the residual value of the encoding spectrum-adjustment frame, and this residual value of the encoding spectrum-adjustment frame is the compressed frame. The data processing method P200 may increase the encoding efficiency of the encoding spectrum-adjustment frame, further reduce the amount of data in the compressed frame, improve the encoding efficiency, and increase the compression ratio. Since the object of the encoding spectrum-adjustment is the original frame, the under-compression-frame is the original frame. In an example of video data, in step S240, the step of performing data compression on the under-compression-frame (original frame) may be executed by at least one compression end processor 220 of the data compression device 200.

S242: Perform the encoding spectrum-adjustment on the under-compression-frame (original frame) to obtain the encoding spectrum-adjustment frame. In this case, the encoding spectrum-adjustment includes using an encoding convolution kernel to convolve the under-compression-frame, so as to smoothly reduce the amplitude of the intermediate-frequency to high-frequency region (including intermediate-frequency region and high-frequency region) of the under-compression-frame. In step S242, the process of encoding spectrum-adjustment of the under-compression-frame may be executed by at least one compression end processor 220 in the data compression device 200.

S242-2: Determine the frame type of the original frame.

In an example of video data, a frame is the basic unit that makes up a video data sequence. When processing video data, it is often calculated with frames as the basic unit. Moreover, when Recommendation ITU-T H.264/H.265 are used to encode video data, a frame is often used as the basic unit for prediction and residual calculation. In the encoding process, a frame is often compressed into different types based on the specific frame image. Therefore, before performing the encoding spectrum-adjustment on the under-compression-frame (original frame), the data compression device 200 needs to determine the frame type of the original frame, and the encoding convolution kernel for different frame types may also be different.

For a video frame sequence, the specific frame types may include intra predictive frame (I frame), forward predictive frame (P frame), and bidirectional predictive frame (B frame). For a sequence of frame with only one frame, it is usually treated as an intra predictive frame (I frame). An I frame is an encoded frame compressed within the full frame. When decoding, only the data of the I frame is needed in order to reconstruct the complete data without referring to other frames; it may be used as a reference frame for subsequent frames. A P frame is an encoded frame that compresses the amount of transmitted data by sufficiently reducing the temporal redundancy information of the previously encoded frame in the image sequence. A P frame may be obtained by predicting according to the preceding P frame or I frame. It compresses the current frame according to the difference between the current frame and the adjacent preceding frame or frames. A joint-compression method of P frame and I frame may achieve higher compression without the issue of significant compression trace. It only refers to an adjacent preceding I frame or P-frame. A B frame compresses the current frame according to the difference between the previous frames, the current frame, and the subsequent frames, that is, only the differences between the current frame and the preceding and subsequent frames are recorded. In general, I frames have the lowest compression efficiency, P frames have higher compression efficiency, and B frames have the highest compression efficiency. During encoding video data, some video frames may be compressed into I frames, some may be compressed into P frames, and others may be compressed into B frames.

The frame type of the original frame includes at least one of I frame, P frame and B frame.

S242-4: Select, based on the frame type of the original frame, a convolution kernel from a group of encoding convolution kernels as the encoding convolution kernel, and convolve the under-compression-frame to obtain an encoding spectrum-adjustment frame.

The spectrum adjustment on the under-compression-frame may be expressed as that the under-compression-frame is multiplied by a transfer function $H_1(f)$ (i.e., encoding spectrum-adjustment function) in the frequency domain, or a corresponding convolution calculation in the time domain. If the under-compression-frame is digitized data, the convolution operation may be performed by selecting an encoding convolution kernel corresponding to the encoding spectrum-adjustment function $H_1(f)$. For the convenience of description, the convolution in the time domain will be used as an example to describe the spectrum adjustment. However, a person skilled in the art should understand that the way of spectrum adjustment by multiplying the frequency domain by the encoding spectrum-adjustment function $H_1(f)$ is also within the scope of protection of the present application.

As described above, the encoding spectrum-adjustment on the under-compression-frame may be performed as a convolution of the under-compression-frame in the time domain. The storage medium of the data compression device 200 may store multiple encoding spectrum-adjustors, that is, a group of encoding spectrum-adjustors, in which each encoding spectrum-adjustor includes an encoding convolution kernel. That is to say, the storage medium of the data compression device 200 may include a group of encoding convolution kernels, and the group of encoding convolution kernels may include at least one convolution kernel. When the data compression device 200 convolves the under-compression-frame, it may select a convolution kernel from the group of encoding convolution kernels as the encoding convolution kernel based on the frame type of the under-compression-frame corresponding to the original frame, and then perform the convolution on the under-compression-frame. When the under-compression-frame corresponding to the original frame is an I frame or a P frame, the process of convolving the I frame or P frame by the data compression device 200 may include: selecting a convolution kernel from the group of encoding convolution kernels as the encoding convolution kernel, and then performing the convolution on the I frame or P frame. Any one of the convolution kernels in the convolution kernel group may smoothly reduce the amplitude of the I-frame or P-frame of the intermediate-frequency to high-frequency region (including intermediate-frequency region and high-frequency region) in the frequency domain. The data compression device 200 may also select a convolution kernel with the best compression effect from the group of encoding convolution kernels as the encoding convolution kernel according to the encoding quality requirements of the original frame. When the under-compression-frame (in this embodiment, the original frame) corresponding to the original frame is a B frame, the encoding convolution kernel of the under-compression-frame is the same as the encoding convolution kernel of an under-compression-frame corresponding to a reference frame closest to the under-compression-frame, or the encoding convolution kernel of the under-compression-frame is the same as the encoding convolution kernel used in the reference frame of the under-compression-frame with the best effect on amplitude reduction. In this way, the effect of reducing the amplitude of the under-compression-frame (original frame) is better, and the effect of encoding spectrum-adjustment is better, so that the compression ratio of the video data is higher.

Figure 5A:
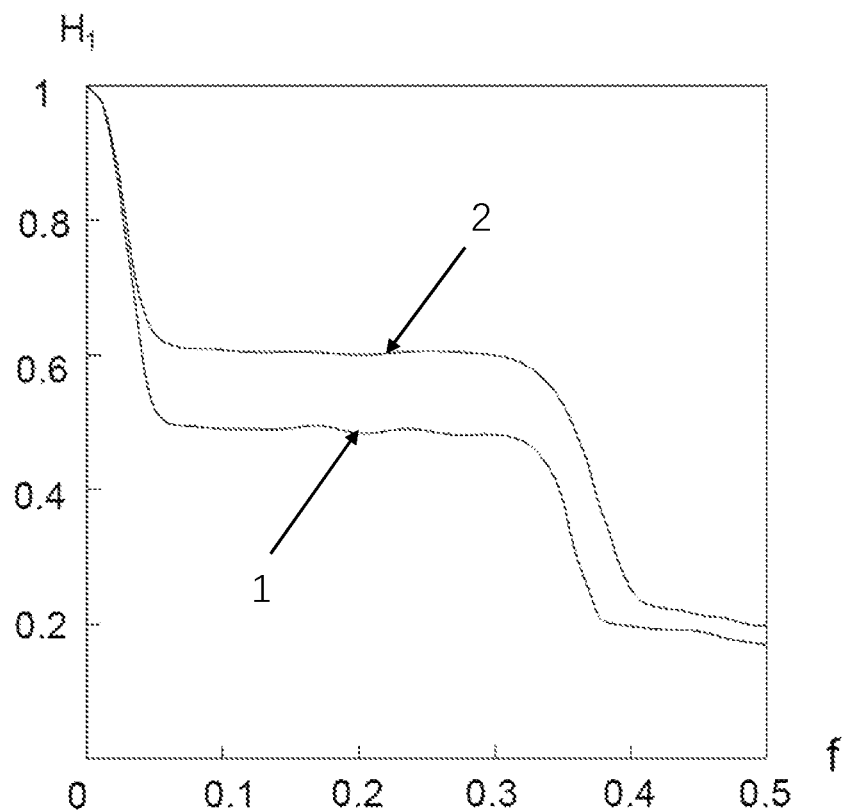
FIG. 5A shows a graph of an encoding spectrum-adjustment function provided according to some exemplary embodiments of the present application.

FIG. 5A shows a graph of an encoding spectrum-adjustment function $H_1(f)$ provided according to an embodiment of the present application. As shown in FIG. 5A, the horizontal axis is the normalized frequency f, and the vertical axis is the amplitude adjustment gain $H_1$ of the encoding spectrum-adjustment function $H_1(f)$. Curve 1 and curve 2 in FIG. 5A represent different encoding spectrum-adjustment functions $H_1(f)$ corresponding to different encoding convolution kernels. The normalized frequency f of the horizontal axis may be divided into low-frequency region, medium-low-frequency region, intermediate-frequency region, medium-high-frequency region and high-frequency region. As shown in FIG. 5A, the maximum value of the normalized frequency on the horizontal axis is 0.5. As mentioned above, the high-frequency region may include the frequencies between (a, 0.5] in the normalized frequency domain, where a is the lower frequency limit of the high-frequency region. For example, a may be any one among 0.33, 0.34, 0.35, 0.36, 0.37, 0.38, 0.39, 0.4, 0.41, 0.42, 0.43, 0.44, and 0.45 in the normalized frequency domain. The intermediate-frequency region may include a frequency between (b, c], where b is the lower frequency limit of the intermediate-frequency region, and c is the upper frequency limit of the intermediate-frequency region. For example, the lower frequency limit b of the intermediate-frequency region may be any frequency among 0.05, 0.06, 0.07, 0.08, 0.09, 0.1, 0.11, 0.12, 0.13, 0.14, 0.15, 0.16, 0.17, 0.18, 0.19 and 0.2 in the normalized frequency domain. The upper frequency limit c of the intermediate-frequency region may be any frequency among 0.33, 0.32, 0.31, 0.3, 0.29, 0.28, 0.27, 0.26 and 0.25 in the normalized frequency domain. The low-frequency region may include the frequency between [0, d] in the normalized frequency domain, where d is the upper frequency limit of the low-frequency region. The upper frequency limit d of the low-frequency region may be any frequency among 0.01, 0.02, 0.03, 0.04 and 0.05 in the normalized frequency domain. In the case where the low-frequency region is not connected to the intermediate-frequency region, the frequency region between the two is referred to as the medium-low-frequency region. Moreover, in the case where the intermediate-frequency region is not connected to the high-frequency region, the frequency region between the two is referred to as the medium-high frequencies region.

As shown in FIG. 5A, the encoding spectrum-adjustment function $H_1(f)$ used in the encoding spectrum-adjustment is greater than zero for the amplitude adjustment gain $H_1$ of the under-compression-frame (original frame) at any frequency f in the frequency domain. The amplitude values of all frequencies processed by the encoding spectrum-adjustment function $H_1(f)$ are also greater than zero, and this no data of any frequency will be lost. Therefore, when the compressed data is decompressed, the data in all frequency ranges may be restored. Otherwise, if there is a zero point in the encoding spectrum-adjustment function $H_1(f)$, the data of the frequency part corresponding to the zero point may be lost, and the decoding end cannot restore the lost data during decompression. As a result, the original data cannot be fully restored. As mentioned above, the original frame is defined as $P_0$, and the encoding spectrum-adjustment frame obtained by processing the original frame by the encoding spectrum-adjustment function $H_1(f)$ is defined as $P_1$, and thus the relationship between $P_0$ and $P_1$ may be expressed as formula (1):

$$P_1 = H_1(f) \cdot P_0 \quad \text{formula (1)}$$

In an example of video data, since human eyes are more sensitive to the data in the intermediate- to low-frequency region than the data in the high-frequency region, when performing the encoding spectrum-adjustment on the original frame of the video data, the information in the intermediate-frequency to low-frequency region in the original frame should be retained as much as possible, and the amplitude gain of the intermediate-frequency and low-frequency region should be relatively stable. The information from the intermediate-frequency to the low-frequency region is retained as stable and complete as possible, so that the information from the intermediate-frequency to low-frequency region may be better restored during decompressing. Furthermore, in order to ensure that the amplitude adjustment gain $H_2$ in the decoding spectrum-adjustment function $H_2(f)$ used when the video data is decompressed is not too large, the attenuation of the encoding spectrum-adjustment function $H_1(f)$ in the intermediate-frequency to low-frequency region cannot be too large. The relationship between $H_2(f)$ and $H_1(f)$ will be introduced in the following description. Since human eyes are relatively insensitive to the high-frequency data, when the encoding spectrum-adjustment is performed on the original frame of the video data, the amplitude of the high-frequency part may be attenuated to a greater extent, so as to greatly reduce the amplitude in the high-frequency region. In this way, the data information contained in the original frame may be reduced, and the compression ratio and coding efficiency may be improved.

Therefore, the encoding spectrum-adjustment function $H_1(f)$ used by the encoding spectrum-adjustment may smoothly reduce the amplitude of the under-compression-frame in the intermediate-frequency to high-frequency region (including intermediate-frequency region and high-frequency region) within the frequency domain. In some embodiments, the encoding spectrum-adjustment function $H_1(f)$ used by the encoding spectrum-adjustment may smoothly reduce the amplitude of the under-compression-frame in the high-frequency region within the frequency domain. The smooth decrease of the amplitude may be that the amplitude is attenuated by a first amplitude adjustment gain value, or that the amplitude is attenuated within a certain error range around the first amplitude adjustment gain value. For example, the first amplitude adjustment gain may be any value between 0 and 1. For example, the first amplitude adjustment gain may be within any two specified intervals among 0, 0.08, 0.08, 0.12, 0.16, 0.20, 0.24, 0.28, 0.32, 0.36, 0.40, 0.44, 0.48, 0.52, 0.56, 0.60, 0.64, 0.68, 0.72, 0.76, 0.80, 0.84, 0.88, 0.92, 0.96 and 1. In addition, the error range may be within any two specified intervals among 0, ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, ±24%, ±25%, ±26%, ±27%, ±28%, ±29%, ±30%, etc. As shown in FIG. 5A, the first amplitude adjustment gain of the encoding spectrum-adjustment in the high-frequency region (probably in the range of 0.4 to 0.5) is around 0.2.

In some embodiments, the encoding spectrum-adjustment function $H_1(f)$ used by the encoding spectrum-adjustment may smoothly reduce the amplitude of the under-compression-frame in the intermediate-frequency region within the frequency domain. The amplitude adjustment gain of the under-compression-frame in the intermediate-frequency region for the encoding spectrum-adjustment is a second amplitude adjustment gain. In some embodiments, the value of the second amplitude adjustment gain may be greater than that of the first amplitude adjustment gain, as shown in FIG. 5A. When the encoding spectrum-adjustment is frequency attenuation (that is, when the encoding spectrum-adjustor is a frequency attenuator), both the first amplitude adjustment gain and the second amplitude adjustment gain are less than 1. That is to say, the reducing degree of the amplitude in the intermediate-frequency region of the under-compression-frame made in the encoding spectrum-adjustment may be lower than that in the high-frequency region.

Further, in the case where the high-frequency region is not connected to the intermediate-frequency region, the encoding spectrum-adjustment function $H_1(f)$ may also adjust the amplitude in the medium-high-frequency region of the under-compression-frame in the frequency domain. The change of the amplitude adjustment gain in the medium-high-frequency region is smooth and continuous.

The encoding spectrum-adjustment function $H_1(f)$ may also retain the direct current part, that is, the amplitude adjustment gain in the part where the frequency is 0 is 1, so as to ensure that the basic information in the original frame has been retained. The average value information may be obtained during data decompression in order to restore the original data. Hence, reducing degree of the amplitude in the low-frequency region made by the encoding spectrum-adjustment function $H_1(f)$ used in the encoding spectrum-adjustment is lower than that in the intermediate-frequency region. However, when the amplitude gain of the direct current part (that is, the part with a frequency of 0) is not 1, the original data may also be restored by designing appropriate $H_2(f)$.

In addition, the encoding spectrum-adjustment function $H_1(f)$ may also smoothly reduce the amplitude in the low-frequency region of the under-compression-frame within the frequency domain. In this case, the amplitude adjustment gain of the encoding spectrum-adjustment to the low-frequency region of the under-compression-frame is a third amplitude adjustment gain. The value of the third amplitude adjustment gain may be greater than that of the second amplitude adjustment gain. When the encoding spectrum-adjustment is frequency attenuation (that is, when the encoding spectrum-adjustor is a frequency attenuator), the third amplitude adjustment gain and the second amplitude adjustment gain are both less than 1. That is to say, the reducing degree of the amplitude in the low-frequency region of the under-compression-frame made in the encoding spectrum-adjustment may be lower than that in the intermediate-frequency region.

Further, in the case where the low-frequency region is not connected to the intermediate-frequency region, the encoding spectrum-adjustment function $H_1(f)$ may also adjust the amplitude in the medium-low-frequency region of the under-compression-frame in the frequency domain. The change of the amplitude adjustment gain in the medium-low-frequency region is smooth and continuous.

As shown in the graph of the encoding spectrum-adjustment function $H_1(f)$ in FIG. 5A, the frequencies between (0, 0.05] belong to the low frequency and medium-low frequency; the frequencies between (0.05, 0.33] belong to the intermediate frequency; the frequencies between (0.33, 0.4] belongs to medium-high frequency; and the frequencies between (0.4, 0.5) belong to the high-frequency. The third amplitude adjustment gain $H_1$ of the low-frequency region is greater than the second amplitude adjustment gain $H_1$ of the intermediate-frequency region. The second amplitude adjustment gain $H_1$ of the intermediate-frequency region is greater than the first amplitude adjustment gain $H_1$ of the high-frequency region. The second amplitude adjustment gain $H_1$ of the intermediate-frequency region is relatively stable, curve 1 is about 0.5, and curve 2 is about 0.6. The first amplitude adjustment gain $H_1$ of the high-frequency region is also relatively stable, curve 1 is slightly lower than 0.2, and curve 2 is slightly higher than 0.2. The curve of the encoding spectrum-adjustment function $H_1(f)$ may be a smooth curve or a non-smooth curve. In engineering implementation, on the basis of achieving amplitude reduction, the curve of the encoding spectrum-adjustment function $H_1(f)$ may be allowed to fluctuate within a small range, and such a fluctuation may not affect the effect of compression. For data other than video data, the parameters of the encoding spectrum-adjustment function $H_1(f)$ may be set according to the receiver's sensitivity to the data. For different forms of data, the receiver's sensitivity to frequency may also be different.

Figure 5B:
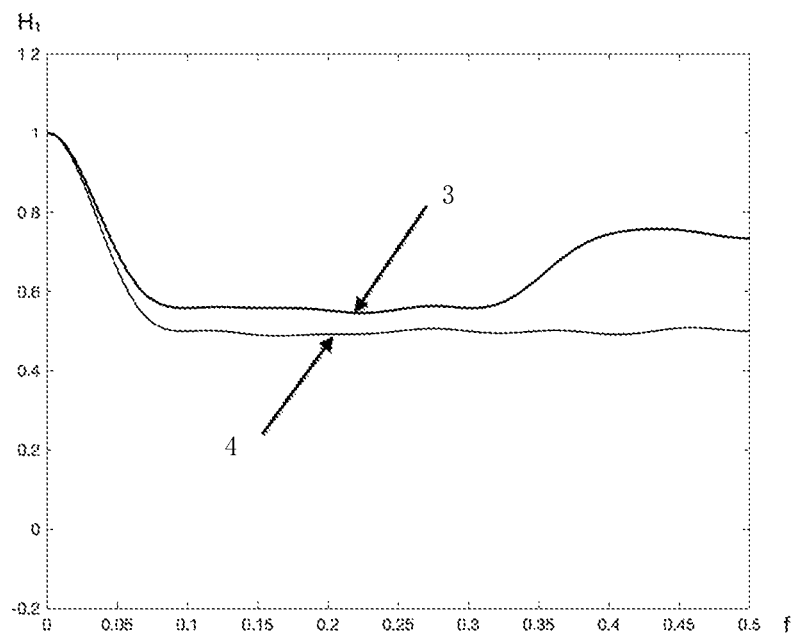
FIG. 5B shows a graph of an encoding spectrum-adjustment function provided according to some exemplary embodiments of the present application.

FIG. 5B shows a graph of an encoding spectrum-adjustment function $H_1(f)$ according to an embodiment of the present application. Curve 3 and curve 4 in FIG. 5B represent different encoding spectrum-adjustment functions $H_1(f)$ corresponding to different encoding convolution kernels. As far as video data is concerned, in some special application scenarios, it may be necessary to properly retain more high-frequency components, such as in certain reconnaissance scenarios. Therefore, in some embodiments, in the encoding spectrum-adjustment function $H_1(f)$ curve, the first amplitude adjustment gain $H_1$ may be greater than the second amplitude adjustment gain (curve 3), or equal to the second amplitude adjustment gain (curve 4).

With regard to video data, in some application scenarios that do not require high image quality, high-frequency components may be completely filtered out. Therefore, the amplitude adjustment gain $H_1$ of the encoding spectrum-adjustment function $H_1(f)$ used in the encoding spectrum-adjustment in the low-frequency to medium-high-frequency region of the under-compression-frame (original frame) in the frequency domain would be greater than zero. The amplitude adjustment gain $H_1$ in the high-frequency region may be equal to 0 (not shown in FIGS. 5A and 5B).

It should be noted that the curves shown in FIGS. 5A and 5B are only described using video data as an example. A person skilled in the art would understand that the curve of the encoding spectrum-adjustment function $H_1(f)$ is not limited to the forms shown in FIGS. 5A and 5B. All of the encoding spectrum-adjustment function $H_1(f)$ that may smoothly reduce the amplitude of the intermediate-frequency region of the original frame in the frequency domain, an encoding spectrum-adjustment function linear combination $$H_1(f) = \sum_{i=1}^{n} k_i H_{1i}(f),$$

an encoding spectrum-adjustment function product combination $$H_1(f) = \prod_{j=1}^{n} k_j H_{1j}(f),$$

and a combination of an linear combination and a product combination are within the scope of protection of the present application, where $$i \geq 1, H_1(f) = \sum_{i=1}^{n} k_i H_{1i}(f)$$

represents the linear combination of n functions, $H_{1i}(f)$ represents the i-th function, $k_i$ represents the weight corresponding to the i-th function, $$j \geq 1, H_1(f) = \prod_{j=1}^{n} k_j H_{1j}(f)$$

represents the product combination of n functions, $k_j$ represents the weight corresponding to the j-th function, and $H_{1j}(f)$ may be any function.

Figures 6, 7:
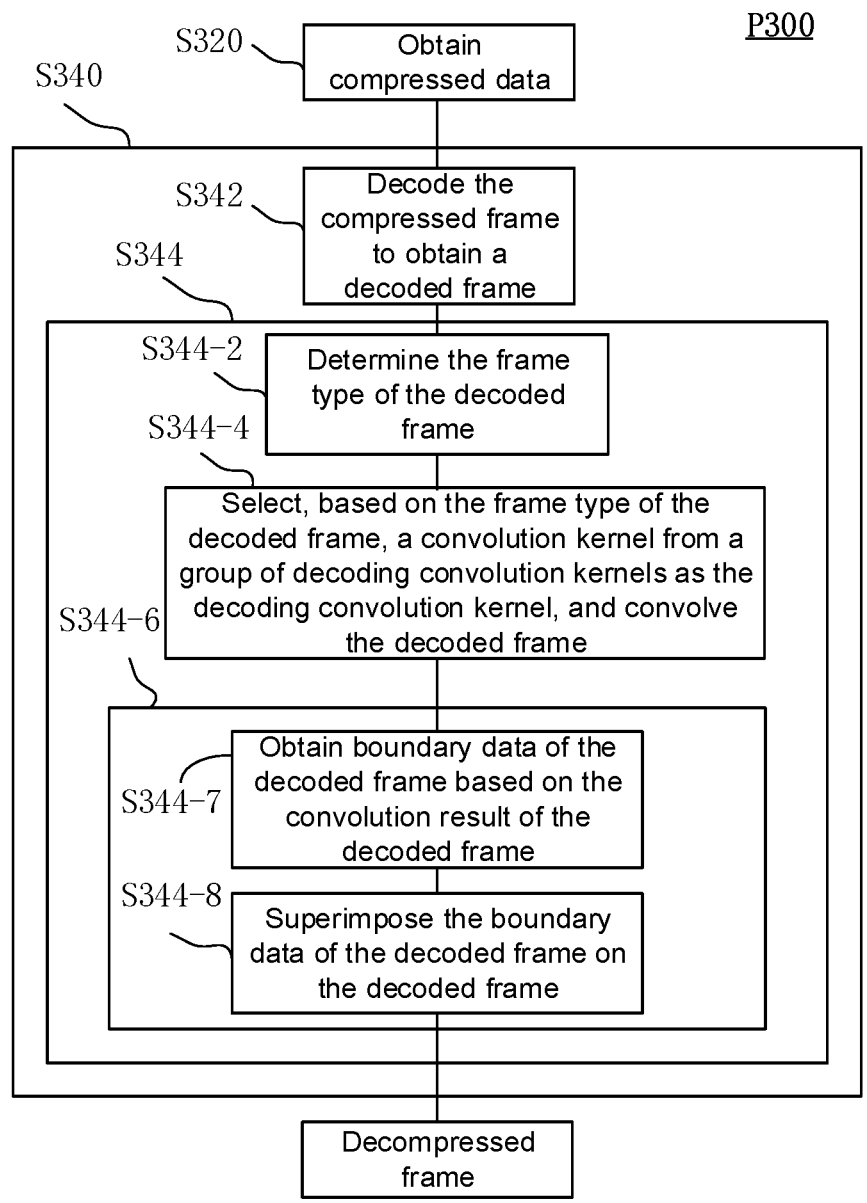
FIG. 6 shows a parameter table of a group of encoding convolution kernels provided according to some exemplary embodiments of the present application.
FIG. 7 shows a flowchart of a data processing method for decompressing a compressed frame according to some exemplary embodiments of the present application.

FIG. 6 shows a parameter table of a group of encoding convolution kernels provided according to an embodiment of the present application. FIG. 6 exemplarily lists the parameters of a group of encoding convolution kernels, where each line in FIG. 6 represents an encoding convolution kernel. For video images, it is necessary to ensure that the gray values of pixels in the encoding spectrum-adjustment frame obtained after encoding convolution is within the range of 0 to 255. Therefore, in this embodiment, it is necessary to divide the convolution result by 256. The group of encoding convolution kernels may be obtained by Fourier transform based on the encoding spectrum-adjustment function $H_1(f)$. FIG. 6 is only an exemplary illustration. A person skilled in the art would know that the group of encoding convolution kernels is not limited to the parameters shown in FIG. 6. All types of groups of encoding convolution kernels that may make the amplitude of the intermediate-frequency region of the original frame in the frequency domain smoothly decrease fall within the scope of protection of the present application.

When the data compression device 200 uses the encoding convolution kernel to convolve the under-compression-frame, the convolution of the under-compression-frame (original frame) may be made in at least one of a vertical direction, a horizontal direction and an oblique direction.

S244: Encode (performing the prediction and finding the residual) the encoding spectrum-adjustment frame to obtain a compressed frame.

After the data compression device 200 performs the encoding spectrum-adjustment on the original frame, an encoding spectrum-adjustment frame is obtained. The frequency components of the intermediate frequency to high frequency in the encoding spectrum-adjustment frame are smaller than the frequency components of the intermediate frequency to high frequency in the original frame. The data compression device 200 encodes the encoding spectrum-adjustment frame to obtain the compressed frame. The data compression device 200 may improve the encoding efficiency of the encoding spectrum-adjustment frame by performing the encoding spectrum-adjustment on the under-compression-frame (original frame), thereby increasing the compression ratio of the original frame and the transmission efficiency of the original data.

FIG. 7 shows a flowchart of the data processing method P300 for decompressing a compressed frame. As described previously, the data decompression device 300 may execute the data processing method P300. Specifically, the storage medium in the data decompression device 300 may store at least one set of instructions. The set of instructions is configured to instruct the decompression processor in the data decompression device 300 to complete the data processing method P300. When the data decompression device 300 is in operation, the decompression processor may read the set of instructions and execute the data processing method P300. The method P300 may include:

S320: Obtain compressed data, where the compressed data include the compressed frame.

The compressed data may include the compressed frame obtained by performing data compression on the original frame in the original data through the data processing method P200. The compressed data may include one or more compressed frames. As mentioned earlier, in the present application, a frame is the basic unit that makes up a data sequence. In data processing, it is often calculated with the frame as a basic unit. When the data processing method P200 is executed by the data compression device 200 to compress data, the original data is compressed in frames as the basic unit. When the data decompression device 300 decompresses the compressed frame, the data decompression may also be performed also using frames as the basic unit. The data compression includes performing the encoding spectrum-adjustment on the original frame.

S340: Perform data decompression on the compressed frame to obtain a decompressed frame.

The data decompression refers to performing decompression calculation on the compressed frame to obtain a decompressed frame, so that the decompressed frame may restore or substantially restore the original data, or the decompressed frame is clearer than the original data. The data decompression includes performing the decoding spectrum-adjustment of an under-decompression-frame, and the under-decompression-frame includes the compressed frame and any data state before the compressed frame becomes the decompressed frame during the decompression process.

The feature that the decoding spectrum-adjustment corresponding to the encoding spectrum-adjustment refers to inputting the under-decompression-frame into a decoding spectrum-adjustor to perform spectrum adjustment. The decoding spectrum-adjustment may enable the under-decompression-frame after the encoding spectrum-adjustment to be completely restored or approximately restored to the state before the encoding spectrum-adjustment without considering calculation errors. As mentioned previously, the encoding spectrum-adjustment may attenuate the amplitude of the under-compression-frame in its frequency domain in the intermediate-frequency to high-frequency region (including intermediate-frequency region and high-frequency region), so that the boundary data of under-compression-frame is blurred to reduce the amount of data generated by encoding. The decoding spectrum-adjustment may restore or even enhance the data after the encoding spectrum-adjustment. The decoding spectrum-adjustment may restore the amplitude of the sensitive frequency in the under-decompression-frame to the state before attenuation. In an example of video data, since human eyes are sensitive to the intermediate-frequency information and low-frequency information in an image, the decoding spectrum-adjustment may restore or even enhance the amplitude of the intermediate-frequency region and the low-frequency region in the video data. In the video data, since human eyes are relatively insensitive to high-frequency data, the decoding spectrum-adjustment may not restore the amplitude of the high-frequency region, so that the amplitude of the high-frequency region remains attenuated. Therefore, the decoding convolution kernel and the decoding spectrum-adjustment function $H_2(f)$ used in the decoding spectrum-adjustment are associated with the encoding convolution kernel and the encoding spectrum-adjustment function $H_1(f)$ used in the encoding spectrum-adjustment. This association relationship will be described in detail in the following description.

Similar to the encoding spectrum-adjustment, the decoding spectrum-adjustment may perform convolution in the time domain to adjust the frequency spectrum of the under-decompression-frame using the decoding spectrum-adjustment function $H_2(f)$ (that is, the decoding transfer function) in the frequency domain. By way of selecting the corresponding decoding spectrum-adjustment function $H_2(f)$ and the decoding convolution kernel, the two methods may achieve the same effect. For the convenience of description, the present application will describe the decoding spectrum-adjustment by performing convolution in the time domain as an example. However, a person skilled in the art would understand that the way to perform spectrum adjustment by multiplying the frequency domain by the decoding spectrum-adjustment function $H_2(f)$ is also within the scope of protection of the present application.

In an example of video data, the data processing method P200 may use a combination of encoding spectrum-adjustment and encoding to compress the original frame to further increase the compression ratio of video data, and improve the efficiency of video transmission. In the video decompression technology, the data processing method P300 may use a combination of decoding (that is, restoring the under-compression-frame based on the residual value and predictive value) and decoding spectrum-adjustment to decompress the compressed frame to restore the data in the compressed frame. The under-decompression-frame may include the compressed frame and any one of the data states during the process in which the compressed frame is subjected to the decoding spectrum-adjustment and decoding. For example, the under-decompression-frame may be the compressed frame, or a decoded frame obtained by decoding, and so on.

The data decompression operation may be a symmetrically-reverse operation of the compression operation. As mentioned above, the encoding spectrum-adjustment may be performed at any stage of the compression operation. Accordingly, the decoding spectrum-adjustment may also be performed at a corresponding stage of the decompression operation. For example, the data decompression operation, that is, step S340, may include at least one of the data decompression methods shown in FIGS. 3A, 3B, 3C and 3D.

For the convenience of description, the present application will take the data decompression device 300 to decode the compressed frame and then perform the decoding spectrum-adjustment (the way shown in FIGS. 3A and 3D) as an example to describe the data decompression in detail. In step S340, the data decompression of the compressed frame includes the data decompression device 300 performing the following operations through at least one decompression-end processor:

S342: Decode the compressed frame to obtain a decoded frame.

The compressed frame may be obtained by encoding the spectrum adjustment frame with the data compression device 200. The data decompression device 300 may decode the compressed frame to obtain the decoded frame. Because there may be certain errors in the encoding and decoding processes, the data in the decoded frame and the encoding spectrum-adjustment frame may be basically consistent. Since the decoded frame is the data generated after decoding the compressed frame, the decoded frame belongs to the under-decompression-frame.

S344: Perform the decoding spectrum-adjustment on the decoded frame to obtain a decompressed frame.

The decoding spectrum-adjustment includes performing convolution of the under-decompression-frame (decoded frame) using the corresponding decoding convolution kernel based on the encoding convolution kernel, such that the data in the decoded frame is restored or substantially restored to the data in the original frame. In step S344, the process of performing the decoding spectrum-adjustment on the decoded frame may be executed by at least one compression-end processor 320 of the data decompression device 300.

S344-2: Determine the frame type of the decoded frame.

As mentioned above, during the process of compressing the original frame, the data compression device 200 encodes the original frame or encoding spectrum-adjustment frame into different types. Therefore, before performing the decoding spectrum-adjustment on the decoded frame, the data decompression device 300 needs to determine the frame type of the decoded frame. The decoding convolution kernel for different frame types may also be different. The frame type of the decoded frame may include at least one of an I frame, a P frame and a B frame. The frame type of the decoded frame may include only one frame type, or may include a plurality of frame types at the same time. The method for determining the frame type of the decoded frame is relatively mature, and it is not the focus of the present application, so it will not be repeated herein.

S344-4: Select, based on the frame type of the decoded frame, a convolution kernel from a group of decoding convolution kernels as the decoding convolution kernel, and convolve the decoded frame.

As described above, the decoding spectrum-adjustment on the decoded frame may be the convolution of the decoded frame in the time domain. The data decompression device 300 storage medium may store multiple different decoding convolution kernels, which thus are referred to as the group of decoding convolution kernels. Each encoding convolution kernel corresponds to at least one decoding convolution kernel in the group of decoding convolution kernels. When the data decompression device 300 performs convolution on the decoded frame, it may select a convolution kernel from the group of decoding convolution kernels as the decoding convolution kernel based on the frame type of the decoded frame, and then perform the decoded frame convolution. The operation of convolution of the under-decompression-frame using the decoding convolution kernel may be referred to as a decoding spectrum-adjustor. In the case where the decoded frame is an I frame or a P frame, the process of convolving the I frame or P frame by the data decompression device 300 may include: selecting any convolution kernel from the group of decoding convolution kernels as the decoding convolution kernel, and then performing the convolution of the I frame or P frame. The data decompression device 300 may also select a convolution kernel with the best decompression effect from the group of decoding convolution kernels as the decoding convolution kernel according to the decoding quality requirements for the decoded frame. In the case where the decoded frame is a B frame, the decoding convolution kernel of the decoded frame may be the same as the decoding convolution kernel of a reference frame closest to the decoded frame, alternatively, the decoding convolution kernel of the decoded frame may be the same as the decoding convolution kernel of a reference frame of the decoded frame with the best data restoration effect.

The data decompression device 300 may convolve the decoded frame in at least one of a vertical direction, a horizontal direction and an oblique direction when using the decoding convolution kernel to convolve the decoded frame. The convolution direction of the decoded frame is the same as that of the original frame, and the convolution order of the decoded frame is opposite to that of the original frame. If the original frame undergoes convolution in the vertical direction alone, the decoded frame may also have the convolution in the vertical direction alone. Similarly, if the original frame only undergoes convolution in the horizontal direction or the oblique direction, then the decoded frame may also have the convolution in the horizontal direction or the oblique direction. If the original frame undergoes convolution in multiple directions, the decoded frame may also have the convolution in multiple directions, and the directions and order of the decoded frame during convolution are opposite to those of the original frame convolution. For example, if the original frame is firstly convolved in the vertical direction and then in the horizontal direction, the decoded frame is firstly convolved in the horizontal direction and then in the vertical direction.

S344-6: Based on the convolution result of the decoded frame, obtain the decompressed frame.

For the convenience of description, the expression of the decoded frame is defined as $P_2$. As mentioned above, if the deviations caused by the encoding and decoding process are small, the data in the decoded frame and the encoding spectrum-adjustment frame are basically consistent to each other. Therefore, the relationship between $P_1$ and $P_2$ may be expressed as formula (2) below:

$$P_2 \approx P_1 \qquad \text{formula (2)}$$

For the convenience of description, the convolution result of the decoded frame is defined as $P_3$. $P_3$ is obtained through the convolution of the decoded frame by the decoding convolution kernel. The decoding spectrum-adjustment function $H_2(f)$ corresponds to the decoding convolution kernel. Thus, the relationship between $P_3$ and $P_2$ may be be expressed as formula (3):

$$P_3 = H_2(f) \cdot P_2 \approx H_2(f) \cdot P_1 \approx H_2(f) \cdot H_1(f) \cdot P_0 \qquad \text{formula (3)}$$

As mentioned previously, the decompressed frame is defined as $P_4$. Since the selection of $H_2(f)$ is based on $H_1(f)$, while the design of $H_1(f)$ retains all of the frequency information of $P_0$, theoretically, without considering the deviation caused by other algorithms, $P_4$ is able to restore all frequency information in $P_0$. That is to say, the data decompression may restore or even enhance the data subjected to the data compression at any frequency in the entire spectrum. In an example of video data, because human eyes are more sensitive to the information in the region from the intermediate frequency to low frequency, the information of the intermediate frequency to low frequency of the decompressed frame should be completely restored or even enhanced. Therefore, the amplitude $P_4$ for the intermediate-frequency to low-frequency region should be greater than or equal to $P_0$. As human eyes are less sensitive to the information in the high-frequency region, the information in the high-frequency region of the decompressed frame may be attenuated to suppress unnecessary high-frequency noise. Therefore, $P_4$ should be greater than $P_0$. The relationship between $P_0$ and $P_4$ may be expressed as formula (4) below:

$$\begin{cases} P_4 \geq P_0, (f \leq f_0) \\ P_4 < P_0, (f > f_0) \end{cases} \qquad \text{formula (4)}$$

For the convenience of description, the overall spectrum adjustment function between $P_0$ and $P_4$ is defined as $H_0(f)$, then the relationship between $P_0$ and $P_4$ may be expressed as formula (5):

$$\begin{cases} P_4 \geq H_0(f) \cdot P_0, (f \leq f_0) \\ P_4 < H_0(f) \cdot P_0, (f > f_0) \end{cases} \qquad \text{formula (5)}$$

Then, the overall spectrum adjustment function $H_0(f)$ may be expressed as formula (6):

$$\begin{cases} H_0(f) \geq 1, (f \leq f_0) \\ H_0(f) < 1, (f > f_0) \end{cases} \qquad \text{formula (6)}$$

Where, $f_0$ is the cut-off value of the human eye's sensitive frequency. For video data, $f_0$ may be 0.33 or other values larger or smaller than 0.33. For different types of data, the value of $f_0$ may be different.

It should be noted that the data decompression device 300 obtains the decompressed frame based on the convolution result $P_3$ of the decoded frame, which may be implemented by different decoding spectrum-adjustment functions $H_2(f)$ and different processing methods.

In some embodiments, the data decompression device 300 may directly use the convolution result $P_3$ of the decoded frame as the decompressed frame, where the relationship between $P_3$ and $P_4$ may be expressed as formula (7):

$$\begin{cases} P_4 = P_3 = H_2(f) \cdot H_1(f) \cdot P_0 \geq P_0, (f \leq f_0) \\ P_4 = P_3 = H_2(f) \cdot H_1(f) \cdot P_0 < P_0, (f > f_0) \end{cases} \qquad \text{formula (7)}$$

In this case, the relationship between the encoding spectrum-adjustment function $H_1(f)$ corresponding to the encoding convolution kernel and the decoding spectrum-adjustment function $H_2(f)$ corresponding to the decoding convolution kernel may be expressed as formula (8):

$$\begin{cases} H_0(f) = H_1(f) \cdot H_2(f) \geq 1, (f \leq f_0) \\ H_0(f) = H_1(f) \cdot H_2(f) < 1, (f > f_0) \end{cases} \qquad \text{formula (8)}$$

Therefore, the relationship between $H_1(f)$ and $H_2(f)$ may be expressed as formula (9):

$$\begin{cases} H_2(f) \geq 1/H_1(f), (f \leq f_0) \\ H_2(f) < 1/H_1(f), (f > f_0) \end{cases} \qquad \text{formula (9)}$$

Figure 8:
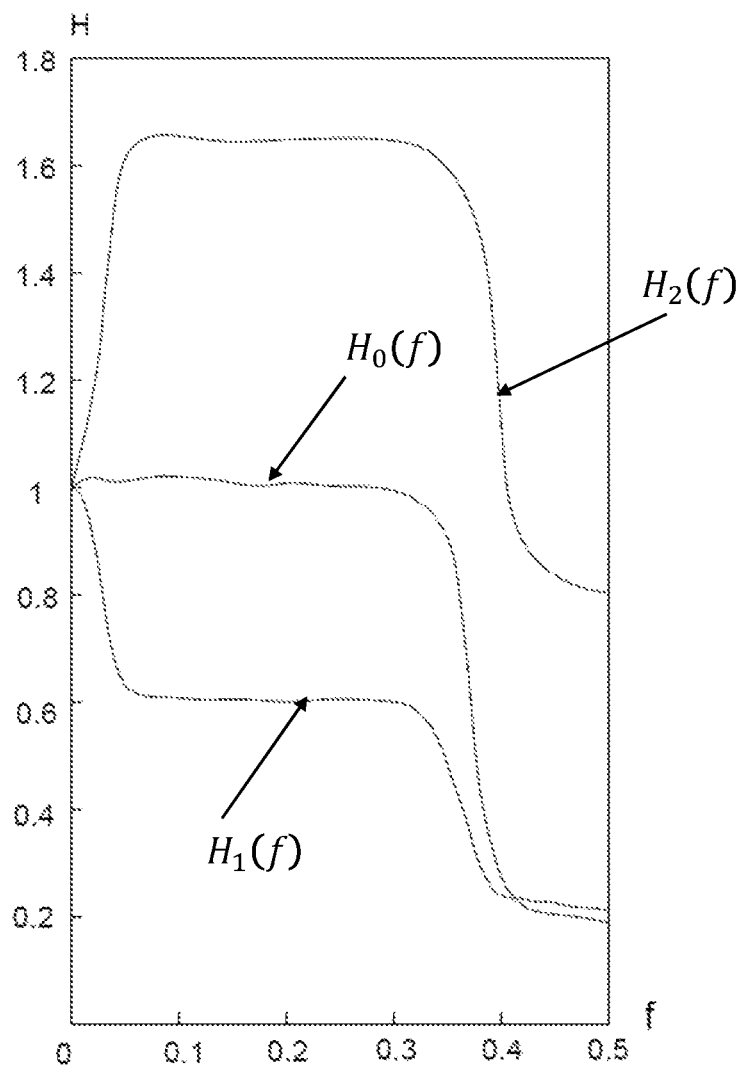
FIG. 8 shows a graph of the curves of an overall adjustment function $H_0(f)$, an encoding spectrum-adjustment function $H_1(f)$ and a decoding spectrum-adjustment function $H_2(f)$ provided according to some exemplary embodiments of the present application.

FIG. 8 shows a graph of an overall adjustment function $H_0(f)$, an encoding spectrum-adjustment function Ha), and a decoding spectrum-adjustment function $H_2(f)$ provided according to an embodiment of the present application. The relationship between $H_0(f)$, $H_1(f)$, and $H_2(f)$ shown in FIG. 8 is the relationship represented by formula (8). As shown in FIG. 8, the horizontal axis is the normalized frequency f, and the vertical axis is the amplitude adjustment gain H. In an example of video data, since human eyes are sensitive to the information from intermediate frequency to low frequency, the information in the spectrum adjustment function $H_0(f)$ is completely retained or even enhanced for the information from intermediate-frequency to low-frequency region. The spectrum adjustment function $H_0(f)$ for the intermediate-frequency to low-frequency region has an amplitude adjustment gain greater than or equal to 1, and the data from the intermediate-frequency to low-frequency region in the decompressed frame may be substantially restored to the data in the original frame. Since human eyes are relatively insensitive to the high-frequency information, the information in the high-frequency region may be attenuated by the spectrum adjustment function $H_0(f)$ so as to suppress the unnecessary high-frequency noise.

In some application scenarios, such as certain reconnaissance scenarios, the frequency range of $f > f_0$ also needs to be restored or enhanced, the relationship between $H_1(f)$ and $H_2(f)$ may be expressed as formula (10) and formula (11):

$$\begin{cases} H_0(f) = H_1(f) \cdot H_2(f) \geq 1, (f \leq f_0) \\ H_0(f) = H_1(f) \cdot H_2(f) \geq 1, (f > f_0) \end{cases} \quad \text{formula (10)}$$

$$\begin{cases} H_2(f) \geq 1/H_1(f), (f \leq f_0) \\ H_2(f) \geq 1/H_1(f), (f > f_0) \end{cases} \quad \text{formula (11)}$$

It should be noted that the curves shown in FIG. 8 are only an exemplary description, and a person skilled in the art would understand that the curves of $H_0(f)$, $H_1(f)$, and $H_2(f)$ are not limited to the forms shown in FIG. 8. All $H_0(f)$, $H_1(f)$ and $H_2(f)$ curves that are in line with the formula (8) or formula (10) are within the scope of protection of the present application. It should be pointed out that all the linear combination of decoding spectrum-adjustment function $$H_2(f) = \sum_{i=1}^{n} k_i H_{2i}(f),$$

the product combination of encoding spectrum-adjustment function $$H_2(f) = \prod_{j=1}^{n} k_j H_{2j}(f),$$

or the combination of linear combination and product combination in line with formula (8) or formula (10) fall within the scope of protection of the present application, where $$i \geq 1, H_2(f) = \sum_{i=1}^{n} k_i H_{2i}(f)$$

represents the linear combination of n functions, $H_{2i}(f)$ represents the i-th function, and ki represents the weight corresponding to the i-th function.

$$j \geq 1, H_2(f) = \prod_{j=1}^{n} k_j H_{2j}(f)$$

represents the product combination of n functions, kj represents the weight corresponding to the j-th function, and $H_{2j}(f)$ may be any function.

The data processing method P300 provided by the present application may also obtain the boundary information of the decoded frame through the decoding spectrum-adjustment function $H_3(f)$, and superimpose the boundary information of the decoded frame on the decoded frame to obtain the decompressed frame, as shown in FIG. 3D. The data decompression device 300 may restore or enhance the boundary information of the decoded frame by adjusting the spectrum adjustment function $H_3(f)$. Thus, the data in the decompressed frame may be restored or enhanced. As shown in FIG. 3D, the process of data compression is consistent with the method shown in FIG. 3A, and will not be repeated here in. As shown in FIG. 3D, in order to obtain the decompressed frame by the data decompression device 300, step S344-6 may be executed by at least one decompression-end processor of the data decompression device 300.

S344-7: Obtain boundary data $P_3$ of the decoded frame $P_2$ based on the convolution result $P_3$ of the decoded frame.

Therefore, the curve of $H_3(f)$ should be designed to express the boundary information of $P_2$.

S344-8: Superimpose the boundary data $P_3$ of the decoded frame on the decoded frame $P_2$ to obtain the decompressed frame $P_4$.

Then the amplitude $P_4$ of the decompressed frame of the decompressed frame may be expressed as formula (12):

$$\begin{cases} P_4 = P_2 + aP_3 = (H_1(f) + aH_3(f) \cdot H_1(f)) \cdot P_0 < P_0, \\ \quad (f \leq f_0) \\ P_4 = P_2 + aP_3 = (H_1(f) + aH_3(f) \cdot H_1(f)) \cdot P_0 < P_0, \\ \quad (f > f_0) \end{cases} \quad \text{formula (12)}$$

Where, $\alpha$ is the boundary enhancement coefficient, indicating the degree of boundary enhancement to the original frame $P_0$. $\alpha$ may be a constant or a function.

In this case, the relationship between the encoding spectrum-adjustment function $H_1(f)$ corresponding to the encoding convolution kernel and the decoding spectrum-adjustment function $H_3(f)$ corresponding to the decoding convolution kernel may be expressed as formula (13):

$$\begin{cases} H_0(f) = aH_1(f) \cdot H_3(f) + H_1(f) \geq 1, (f \leq f_0) \\ H_0(f) = aH_1(f) \cdot H_3(f) + H_1(f) < 1, (f > f_0) \end{cases} \quad \text{formula (13)}$$

By means of adjusting the boundary enhancement coefficient $\alpha$, $H_0(f)$ may be quickly adjusted without changing $H_1(f)$ and $H_3(f)$.

Therefore, the relationship between $H_1(f)$ and $H_3(f)$ may be expressed as formula (14):

$$\begin{cases} H_3(f) \geq (1 - H_1(f))/aH_1(f), (f \leq f_0) \\ H_3(f) < (1 - H_1(f))/aH_1(f), (f > f_0) \end{cases} \quad \text{formula (14)}$$

In some embodiments, in addition to restoring the original frame, the decompression process may also enhance the original frame. For example, if the original frame is a frame of a video, the decoded frame may further clarify the original frame, that is, enhance the clarity of the object boundary in the original frame. When the sharpness of the boundary needs to be enhanced, as long as $H_0(f)$ in the above formulas (8) to (13) is greater than 1 in the selected region of the frequency domain, the clarity enhancement may be achieved.

As mentioned above, in the case where the original frame undergoes convolution in multiple directions, the decoded frame may also have the convolution in multiple directions, and the direction and order of the decoded frame during convolution are opposite to those of the original frame during convolution. For example, in the case where the original frame is firstly convolved in the vertical direction and then horizontally, the decoded frame would be firstly convolved in the horizontal direction and then convolved in the vertical direction. It should be noted that the decoded frame needs to be convolved in the horizontal direction to obtain horizontal boundary data first, and then the horizontal data in the horizontal direction of the decoded frame are superimposed on the decoded frame, next the convolution in the vertical direction may obtain the boundary data in the vertical direction, and the boundary data in the vertical direction are superimposed on the decoded frame.

Figure 9:
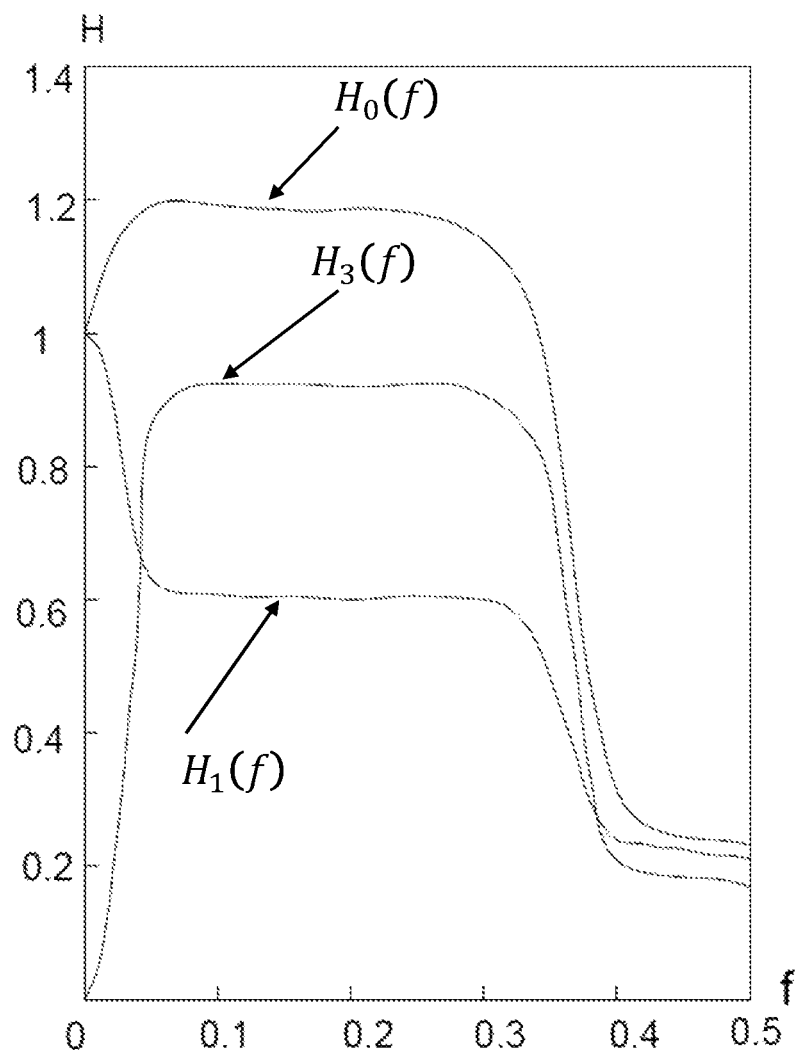
FIG. 9 shows a graph of the curves of an overall adjustment function $H_0(f)$, an encoding spectrum-adjustment function $H_1(f)$ and a decoding spectrum-adjustment function $H_3(f)$ provided according to some exemplary embodiments of the present application.

FIG. 9 shows the graph of an overall adjustment function $H_0(f)$, an encoding spectrum-adjustment function $H_1(f)$ and a decoding spectrum-adjustment function $H_3(f)$ provided according to an embodiment of the present application. The relationship between $H_0(f)$, $H_1(f)$ and $H_3(f)$ shown in FIG. 9 is the relationship represented by formula (13). In FIG. 9, a=1.2 is used as an example for description. As shown in FIG. 9, the horizontal axis is the normalized frequency f, and the vertical axis is the amplitude adjustment gain H. In an example of video data, since human eyes are more sensitive to the information of intermedia to low frequencies, the spectrum adjustment function $H_0(f)$ may completely retain or even enhance the information in the intermediate-frequency to low-frequency region. The spectrum adjustment function $H_0(f)$ may have an amplitude adjustment gain greater than or equal to 1 in the intermediate-frequency to low-frequency region. Since human eyes are less sensitive to high-frequency information, the information in the high-frequency region may be attenuated by the spectrum adjustment function $H_0(f)$ to reduce unnecessary high-frequency noise that may be generated in the decompressed frame. When $H_0(f)=1$, the spectrum adjustment function $H_0(f)$ performs the normal mode of spectrum adjustment on the decompressed frame. That is, in the spectrum adjustment function $H_0(f)$ the information is completely retained for the intermediate-frequency to low-frequency region, and the data in the decompressed frame may be substantially restored to the data in the original frame. When $H_0(f)>1$, the spectrum adjustment function $H_0(f)$ performs the enhanced mode of spectrum adjustment on the decompressed frame. That is, in the spectrum adjustment function $H_0(f)$, the information in the intermediate-frequency to the low-frequency region is enhanced, and the data in the decompressed frame is enhanced as compared to the data in the original frame. It should be noted that the curves shown in FIG. 9 are only an exemplary description, and a person skilled in the art would understand that the curves of $H_0(f)$, $H_1(f)$ and $H_3(f)$ are not limited to the forms shown in FIG. 9. All $H_0(f)$, $H_1(f)$ and $H_3(f)$ curves in line with formula (13) are within the scope of protection of the present application. In addition, it should be noted that all decoding spectrum-adjustment functions in line with formula (13), including the linear combination combined $$H_3(f) = \sum_{i=1}^{n} k_i H_{3i}(f),$$

the product combination of the encoding spectrum-adjustment function $$H_3(f) = \prod_{j=1}^{n} k_j H_{3j}(f),$$

and the a combination of linear combination and the product combination, fall within the scope of protection of the present application, where $$i \geq 1, H_3(f) = \sum_{i=1}^{n} k_i H_{3i}(f)$$

represents the linear combination of n functions, $H_{3i}(f)$ represents the i-th function, $k_i$ represents the weight corresponding to the i-th functions, $$j \geq 1, H_3(f) = \prod_{i=1}^{n} k_j H_{3j}(f)$$

represents the product combination of n functions, $k_j$ represents the weight corresponding to the j-th function, and $H_{3j}(f)$ may be any function.

FIG. 10 shows a parameter table of a group of decoding convolution kernels in a normal mode according to an embodiment of the present application. FIG. 10 exemplarily lists the parameters of a normal mode group of decoding convolution kernels, where each line in FIG. 10 represents a normal mode decoding convolution kernel. The group of encoding convolution kernels of the normal mode is obtained by Fourier transform based on the decoding spectrum-adjustment function $H_2(f)$ of the normal mode. For video images, it is necessary to ensure that the gray values of pixels in the encoding spectrum-adjustment frame obtained after encoding convolution is within the range of 0 to 255. Therefore, in this embodiment, it is necessary to divide the convolution result by 256. The decoding spectrum-adjustment function $H_2(f)$ is obtained corresponding to $H_0(f)=1$. The data decompression device 300 may use the normal mode group of encoding convolution kernels shown in FIG. 10 to make the data of the decompressed frame substantially in line with the data of the original frame. FIG. 10 is only an exemplary illustration. A person skilled in the art would know that the normal mode group of decoding convolution kernels is not limited to the parameters shown in FIG. 10. All types of the groups of decoding convolution kernels that that may allow the amplitude of the decoded frame to smoothly decrease in the high-frequency region and to restore in the intermediate-frequency to low-frequency region in the frequency domain fall within the scope of the present application protection.

FIG. 11 shows a parameter table of an enhanced mode of group of decoding convolution kernels provided according to an embodiment of the present application, where each line in FIG. 11 represents an enhanced mode decoding convolution kernel. The group of encoding convolution kernels of the enhanced mode is obtained by Fourier transform based on the decoding spectrum-adjustment function $H_2(f)$ of the enhanced mode. For video images, it is necessary to ensure that the gray values of pixels in the encoding spectrum-adjustment frame obtained after encoding convolution is within the range of 0 to 255. Therefore, in this embodiment, it is necessary to divide the convolution result by 256. The decoding spectrum-adjustment function $H_2(f)$ is obtained corresponding to $H_0(f)=1$. The data decompression device 300 may use the enhanced mode group of encoding convolution kernels shown in FIG. 11 to enhance the data of the decompressed frame. FIG. 11 is only an exemplary illustration. A person skilled in the art would know that the enhanced mode group of decoding convolution kernels is not limited to the parameters shown in FIG. 11. All types of the groups of decoding convolution kernels that that may allow the amplitude of the decoded frame to smoothly decrease in the high-frequency region and to enhance in the intermediate-frequency to low-frequency region in the frequency domain fall within the scope of the present application protection. When the data decompression device 300 decompresses the compressed frame, it may select a normal mode decoding convolution kernel or an enhanced mode decoding convolution kernel as the decoding convolution kernel according to user needs.

In summary, the data processing system 100 provided by the present application, when compressing the original data, executes the method P200 through the data compression device 200, and uses an encoding convolution kernel to perform an encoding spectrum-adjustment on the original frame in the original data so as to smoothly reduce the amplitude of the original frame in the intermediate-frequency to high-frequency region (including both the intermediate-frequency region and the high-frequency region). In this way, the data information in the original frame is reduced, the encoding efficiency is improved. Thus, the compressed data volume is reduced, and the data compression efficiency and data transmission efficiency are improved. The data processing system 100 provided by the present application, when decompressing the compressed frame, executes the method P300 through the data decompression device 300, and performs a decoding spectrum-adjustment on the compressed frame using a decoding convolution kernel, where the decoding convolution kernel corresponds to the encoding convolution kernel. Thus, the intermediate frequency to low frequency data in the compressed frame is restored to obtain a decompressed frame. The method and system may improve data compression efficiency and transmission efficiency.

The present application further provides a non-transitory storage medium that stores at least one set of executable instructions for data processing. When the executable instruction is executed by a processor, the executable instruction directs the processor to implement the steps of the data processing method P200. In some embodiments, various aspects of the present application may also be implemented in the form of a program product, which includes program code. When the program product runs on the data compression device 200, the program code is used to cause the data compression device 200 to perform the data processing steps as described in the present application. The program product for implementing the above method may use a portable compact disk read-only memory (CD-ROM) and include program code; in addition, it may be run on the data compression device 200, such as a personal computer. However, the program product of the present application is not limited to the foregoing; in the present application, the readable storage medium may be any tangible medium containing or storing the program. The program may be used by or in combination with an instruction execution system (for example, the compression-side processor 220). The program product may employ any combination of one or more readable media. The readable medium may be a readable signal medium or a readable storage medium. The readable storage medium may include, but is not limited to, a system, device or apparatus of electrical, magnetic, optical, electromagnetic, infrared, or semiconductor, or any combination thereof. More specific examples of the readable storage medium may include: an electrical connection with one or more wires, a portable disk, a hard disk, a random access memory (RAM), a read only memory (ROM), an erasable programmable read only memory (EPROM or flash memory), an optical fiber, a portable compact disk read-only memory (CD-ROM), an optical storage device, a magnetic storage device, or any suitable combination of the foregoing. The computer-readable storage medium may include a data signal propagated in a baseband or as part of a carrier wave, in which the readable program code is carried. This propagated data signal may take many different forms, including but not limited to, an electromagnetic signal, an optical signal, or any suitable combination of the foregoing. The readable storage medium may also be any readable medium other than the readable storage medium, and the readable medium may send, propagate, or transmit a program for use by or in combination with an instruction execution system, apparatus, or device. The program code contained in the readable storage medium may be transmitted in any appropriate medium, including but not limited to, wireless, wired, optical cable, RF, etc., or any suitable combination of the foregoing. The program code for performing the operations of the present application may be written in any combination of one or more programming languages. The programming language includes object-oriented programming languages such as Java, C++, etc., and also includes conventional procedural programming languages such as "C" language or similar programming languages. The program code may be completely executed on the data compression device 200, partially executed on the data compression device 200, executed as an independent software package, partially executed on the data compression device 200, partially executed on a remote computing device, or executed completely on a remote computing device. In a case where a remote computing device is used, the remote computing device may be connected to the data compression device 200 through the transmission medium 120, or may be connected to an external computing device.

Some specific embodiments of the present application have been described above, while other embodiments are also within the scope of the claims. In some cases, the actions or steps recited in the claims may be performed in a different order than in the embodiments and still achieve the desired results. In addition, the processes depicted in the drawings do not necessarily require a specific order or sequence to achieve the desired results. In certain embodiments, multitasking and parallel processing are also possible or may be even advantageous.

In summary, after reading this detailed disclosure, those skilled in the art may understand that the foregoing detailed disclosure may be presented by way of example only, and may not be limiting. Although not explicitly stated herein, those skilled in the art will understand that the present application is intended to cover various changes, improvements and modifications of the embodiments. These changes, modifications, and improvements are intended to be made by the present disclosure and are within the spirit and scope of the exemplary embodiments of the present disclosure.

In addition, some of the terms in this application have been used to describe embodiments of the present disclosure. For example, "one embodiment", "an embodiment" and/or "some embodiments" means that a particular feature, structure or characteristic described in connection with the embodiment may be included in at least one embodiment of the present disclosure. Therefore, it should be emphasized and understood that in various parts of the present disclosure, two or more references to "an embodiment" or "one embodiment" or "an alternate embodiment" are not necessarily referring to the same embodiment. Furthermore, the particular features, structures, or characteristics may be combined as appropriate in one or more embodiments of the present disclosure.

It should be understood that in the description of the embodiments of the present disclosure, to assist in understanding a feature and for the purpose of simplifying the present disclosure, sometimes various features may be combined in a single embodiment, or drawings, description thereof. Alternatively, various features may be described in different embodiments of the present application. However, this is not to say that a combination of these features is necessary, and it is entirely possible for those skilled in the art to understand that a part of these features may be extracted as a separate embodiment. That is to say, the embodiments in the present application may also be understood as the integration of a plurality of secondary embodiments. It is also true that the content of each of the sub-embodiments may be less than all of the features of a single previously disclosed embodiment.

Each of the patents, patent applications, patent application publications, and other materials, such as articles, books, instructions, publications, documents, products, etc., cited herein are hereby incorporated by reference, which are applicable to all contents used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistent or conflicting in descriptions, definitions, and/or use of a term associated with this document and descriptions, definitions, and/or use of the term associated with any materials, the term in this document shall prevail.

Finally, it should be understood that the embodiments of the application disclosed herein are merely described to illustrate the principles of the embodiments of the application. Other modified embodiments are also within the scope of this application. Therefore, the embodiments disclosed herein are by way of example only and not limitations. Those skilled in the art may adopt alternative configurations to implement the invention in this application in accordance with the embodiments of the present application. Therefore, the embodiments of the present application are not limited to those embodiments that have been precisely described in this disclosure.

The invention claimed is:

1. A data processing method, comprising:
   selecting an original frame from original video data, the original frame including data of a preset number of bytes;
   performing data compression to the original frame to obtain a compressed frame; and
   transmitting the compressed frame to a transmission medium, wherein,
   the data compression includes performing an encoding spectrum-adjustment to an under-compression-frame, the under-compression-frame includes the original frame and any data state before the original frame becomes the compressed frame during the data compression, and
   the encoding spectrum-adjustment keeps all frequency components of the under-compression-frame and includes using an encoding convolution kernel to convolve the under-compression-frame, so as to smoothly reduce an amplitude of an intermediate-frequency region of the under-compression-frame in a frequency domain within a predetermined error range around a second amplitude adjustment gain.

2. The data processing method according to claim 1, wherein the encoding spectrum-adjustment smoothly reduces an amplitude in a high-frequency region in the frequency domain within a predetermined error range around a first amplitude adjustment gain.

3. The data processing method according to claim 1, wherein the encoding spectrum-adjustment smoothly reduces an amplitude of a low-frequency region of the under-compression-frame in the frequency domain within a predetermined error range around a third amplitude adjustment gain; and
   a reducing degree of the amplitude of the low-frequency region of the under-compression-frame by the encoding spectrum-adjustment is lower than that of the intermediate-frequency region.

4. The data processing method according to claim 1, wherein an amplitude adjustment gain of the under-compression-frame at any frequency in the frequency domain resulted from the encoding spectrum-adjustment is greater than zero.

5. The data processing method according to claim 1, wherein the performing of the data compression on the original frame includes at least one of the following ways:
   performing the encoding spectrum-adjustment on the original frame, and then performing a prediction and finding a residual with the original frame after the encoding spectrum-adjustment;
   performing the prediction with the original frame to obtain a predicted original frame, and then performing the encoding spectrum-adjustment with the original frame and the predicted original frame and finding the residual; or
   performing the prediction and finding the residual with the original frame, and then performing the encoding spectrum-adjustment with the residual.

6. The data processing method according to claim 1, wherein the performing of the encoding spectrum-adjustment to the under-compression-frame includes:
   determining a frame type of the original frame; and
   selecting, based on the frame type of the original frame, a convolution kernel from a group of encoding convolution kernels as the encoding convolution kernel to convolve the under-compression-frame.

7. The data processing method according to claim 6, wherein the frame type includes at least one of an intra predictive frame, a forward predictive frame, or a bidirectional predictive frame.

8. The data processing method according to claim 7, wherein when the original frame is a bidirectional predictive frame, the encoding convolution kernel of the under-compression-frame corresponding to the original frame is the same as the encoding convolution kernel of the under-compression-frame corresponding to a reference frame that is closest to the original frame.

9. The data processing method according to claim 6, wherein the convolving of the under-compression-frame includes:
   convolving the under-compression-frame in at least one of a vertical direction, a horizontal direction, or an oblique direction.

10. A data processing system, comprising:
    at least one storage medium including at least one set of instructions for data processing; and
    at least one processor in communication connection with the at least one storage medium, wherein during operation, the at least one processor executes the at least one set of instructions to:
      select an original frame from original video data, the original frame including data of a preset number of bytes; and
      perform data compression to the original frame to obtain a compressed frame; and transmitting the compressed frame to a transmission medium, wherein,
the data compression includes performing an encoding spectrum-adjustment to an under-compression-frame, the under-compression-frame includes the original frame and any data state before the original frame becomes the compressed frame during the data compression, and
the encoding spectrum-adjustment keeps all frequency components of the under-compression-frame and includes using an encoding convolution kernel to convolve the under-compression-frame, so as to smoothly reduce an amplitude of an intermediate-frequency region of the under-compression-frame in a frequency domain within a predetermined error range around a second amplitude adjustment gain.

11. A data processing method, comprising:
obtaining compressed data from a transmission medium, the compressed data including a compressed frame obtained by performing data compression on an original frame of video data, and the data compression including an encoding spectrum-adjustment to the original frame; and
performing data decompression on the compressed frame to obtain a decompressed frame; and
outputting the decompressed frame, wherein,
the data decompression includes performing a decoding spectrum-adjustment to an under-decompression-frame, the under-decompression-frame includes the compressed frame and any data state before the compressed frame becomes the decompressed frame during the data decompression, and
the decoding spectrum-adjustment corresponds to the encoding spectrum-adjustment.

12. The data processing method according to claim 11, wherein,
the encoding spectrum-adjustment includes using an encoding convolution kernel to convolve the under-compression-frame, so that an amplitude adjustment gain of the under-compression-frame at any frequency from low frequencies to medium-high frequencies is greater than zero, the under-compression-frame includes the original frame and any data state before the original frame becomes the compressed frame during the data compression; and
the decoding spectrum-adjustment includes using a corresponding decoding convolution kernel to convolve the under-decompression-frame based on the encoding convolution kernel.

13. The data processing method according to claim 12, wherein the performing of the data decompression on the compressed frame includes:
decoding the compressed frame to obtain a decoded frame, the under-decompression-frame including the decoded frame; and
performing the decoding spectrum-adjustment on the decoded frame to obtain the decompressed frame.

14. The data processing method according to claim 13, wherein the performing of the decoding spectrum-adjustment on the decoded frame includes:

determining a frame type of the decoded frame;
selecting, based on the frame type of the decoded frame, a convolution kernel from a group of decoding convolution kernels as the decoding convolution kernel, and convolving the decoded frame; and
obtaining the decompressed frame based on a convolution result of the decoded frame.

15. The data processing method according to claim 14, wherein the obtaining of the decompressed frame based on a convolution result of the decoded frame includes:
obtaining boundary data of the decoded frame based on the convolution result of the decoded frame; and
superimposing the boundary data of the decoded frame on the decoded frame to obtain the decompressed frame.

16. The data processing method according to claim 14, wherein the obtaining of the decompressed frame based on a convolution result of the decoded frame includes:
using the convolution result of the decoded frame as the decompressed frame.

17. The data processing method according to claim 14, wherein the frame type includes at least one of an intra predictive frame, a forward predictive frame, and a bidirectional predictive frame.

18. The data processing method according to claim 17, wherein when the decoded frame is a bidirectional predictive frame, the decoding convolution kernel of the decoded frame is the same as the decoding convolution kernel of a reference frame closest to the decoded frame.

19. The data processing method according to claim 14, wherein the convolving the decoded frame includes:
convolving the decoded frame in at least one of a vertical direction, a horizontal direction, and an oblique direction.

20. A data processing system, comprising:
at least one storage medium including at least one set of instructions for data processing;
at least one processor in communication connection with the at least one storage medium, wherein during operation, the at least one processor executes the at least one set of instructions to:
obtaining compressed data from a transmission medium, the compressed data including a compressed frame obtained by performing data compression on an original frame of video data, and the data compression including an encoding spectrum-adjustment to the original frame; and
performing data decompression on the compressed frame to obtain a decompressed frame; and
outputting the decompressed frame, wherein
the data decompression includes performing a decoding spectrum-adjustment to an under-decompression-frame, the under-decompression-frame includes the compressed frame and any data state before the compressed frame becomes the decompressed frame during the data decompression, and
the decoding spectrum-adjustment corresponds to the encoding spectrum-adjustment.

* * * * *